(12) United States Patent
Samanta

(10) Patent No.: US 12,534,561 B2
(45) Date of Patent: Jan. 27, 2026

(54) CONTROLLED RADICAL POLYMERIZATION

(71) Applicant: BASF Coatings GmbH, Münster (DE)

(72) Inventor: Shampa R. Samanta, Southfield, MI (US)

(73) Assignee: BASF COATINGS GMBH, Muenster (DE)

( * ) Notice: Subject to any disclaimer, the term of this patent is extended or adjusted under 35 U.S.C. 154(b) by 674 days.

(21) Appl. No.: 17/754,781

(22) PCT Filed: Oct. 8, 2020

(86) PCT No.: PCT/EP2020/078250
§ 371 (c)(1),
(2) Date: Apr. 12, 2022

(87) PCT Pub. No.: WO2021/074001
PCT Pub. Date: Apr. 22, 2021

(65) Prior Publication Data
US 2024/0294689 A1    Sep. 5, 2024

(30) Foreign Application Priority Data
Oct. 16, 2019   (EP) ................................. 19203539

(51) Int. Cl.
*C08F 293/00* (2006.01)
(52) U.S. Cl.
CPC ...... *C08F 293/005* (2013.01); *C08F 2438/01* (2013.01)

(58) Field of Classification Search
CPC .............. C08F 220/1804; C08F 220/20; C08F 220/325; C08F 212/08; C08F 226/12
See application file for complete search history.

(56) References Cited

U.S. PATENT DOCUMENTS

| | | | |
|---|---|---|---|
| 5,637,646 | A | 6/1997 | Ellis |
| 5,763,546 | A | 6/1998 | Jung et al. |
| 6,121,371 | A | 9/2000 | Matyjaszewski et al. |
| 6,365,666 | B1 | 4/2002 | McCollum et al. |
| 6,642,301 | B2 | 11/2003 | White et al. |
| 7,019,082 | B2 | 3/2006 | Matyjaszewski et al. |
| 8,822,610 | B2 | 9/2014 | Jakubowski et al. |
| 9,012,528 | B2 | 4/2015 | Jakubowski et al. |
| 2004/0204556 | A1 * | 10/2004 | Matyjaszewski ... C08F 293/005 526/348 |

(Continued)

FOREIGN PATENT DOCUMENTS

| | | |
|---|---|---|
| CN | 104755506 A | 7/2015 |
| EP | 1555273 A1 | 7/2005 |

(Continued)

OTHER PUBLICATIONS

European Search Report for EP Patent Application No. 19203539.2, Issued on Feb. 21, 2020, 4 pages.

(Continued)

*Primary Examiner* — Kregg T Brooks
*Assistant Examiner* — Devin Mitchell Darling
(74) *Attorney, Agent, or Firm* — Armstrong Teasdale LLP

(57) ABSTRACT

Disclosed herein is a process for preparing a polymer by radical polymerization. More specifically, the process disclosed herein is for preparing a polymer by controlled radical polymerization.

15 Claims, 6 Drawing Sheets

(56) References Cited

U.S. PATENT DOCUMENTS

| | | |
|---|---|---|
| 2009/0171024 A1 | 7/2009 | Jakubowski et al. |
| 2009/0176951 A1* | 7/2009 | Matyjaszewski ..... C08F 212/08 526/200 |
| 2010/0030040 A1 | 2/2010 | Poeze et al. |
| 2011/0082230 A1 | 4/2011 | Jakubowski et al. |

FOREIGN PATENT DOCUMENTS

| | | |
|---|---|---|
| WO | 2007075817 A1 | 7/2007 |
| WO | 2009155303 A2 | 12/2009 |

OTHER PUBLICATIONS

International Search Report and Written Opinion for corresponding PCT/EP2020/078250 mailed Nov. 23, 2020, 8 Pages.

\* cited by examiner

CONTROLLED RADICAL POLYMERIZATION

CROSS-REFERENCE TO RELATED APPLICATIONS

This application is a U.S. National Phase Application of International Patent Application No. PCT/EP2020/078250, filed Oct. 8, 2020, which claims priority to European Patent Application No. 19203539.2, filed Oct. 16, 2019, each of which is hereby incorporated by reference herein.

TECHNICAL FIELD

The presently claimed invention relates to a process for preparing a polymer by radical polymerization. The presently claimed invention specifically relates to a process for preparing a polymer by super advanced controlled radical polymerization.

BACKGROUND

The controlled radical polymerization (CRP) procedures are traditionally utilized for the synthesis of high-performance functional materials and functionalized polymers which demonstrate unique properties and can be used in various specialty applications, such as adhesives, lubricants, coatings, dispersants and bio-applications including drug delivery. Examples of such procedures are atom transfer radical polymerization (ATRP), reversible addition fragmentation transfer (RAFT) and nitroxide mediated polymerization (NMP). In conventional ATRP, NMP and RAFT procedures, the polymerization is carried out by adding all the reagents, including the monomers, the initiator, the catalyst and the chain transfer agent at once. The conventional processes in the CRP procedures have many challenges, such as (i) the difficulty in implementing relatively air sensitive polymerization into the existing plants built for conventional radical polymerization, and (ii) the possibility of uncontrolled exothermic processes due to the presence of large amounts of the monomers in the reactor, especially for highly reactive acrylates.

The procedures for improved levels of control in these various CRP processes are known in the art. The improvements are directed to control of the exothermic reaction by controlled feeding of the reducing agent. In the state of the art, polymerization processes focused on improved industrial scalability are known and described, for instance, in the following references.

U.S. Pat. No. 9,012,528 B2 describes a polymerization process comprising the step of feeding a reducing agent or a radical precursor continuously or intermittently to the reaction medium.

U.S. Pat. No. 8,822,610 B2 describes a method for operating an ATRP polymerization process comprising the step of mixing an unsaturated monomer, an atom transfer radical polymerization initiator, a metal catalyst, and optionally a ligand to form a mixture.

U.S. Pat. No. 5,637,646 B2 describes a method of polymerization of free-radically polymerizable vinyl monomers in a batch reactor under adiabatic conditions comprising the step of providing a mixture comprising free radically co-polymerizable vinyl monomers, a free radical initiator, optionally a chain transfer agent and a crosslinking agent.

WO 2009/155303 A2 describes a method of conducting a controlled radical polymerization including providing a mixture of at least one monomer, at least one monomer solvent, at least one metal coordinating compound, and at least one initiator.

The methods and compositions disclosed in the prior arts have limitations. The conventional ATRP methods are not suitable for industrial application, because of the drawbacks such as, excessive heat generation, need for excess amount of catalyst due to unavoidable radical-radical termination, sensitivity to oxygen that can lead to termination of the polymerization reaction, uncontrolled exothermic processes due to the presence of a large amount of monomers in the reactor. In the methods disclosed in the prior arts, the monomer is added to the reaction vessel at once. Adding the monomer at once at the beginning of the polymerization ensures low oxygen introduction during the polymerization process and more uniform molecular weight distribution. However, when a highly reactive monomer such as hydroxy ethyl acrylate (HEA) or methyl acrylate is used for a CRP process, either by a conventional or continuous reducing agent feed method, there always remains a high risk of uncontrolled exotherm. This makes it difficult to conduct the polymerization on a large-scale. Further, in a continuous monomer feeding method that is utilized in traditional-CRP processes, the oxygen and the inhibitor will react with the catalyst and the reaction is stopped. In addition, the control over polymer molecular weight is lost at high monomer conversions due to diffusion-controlled reactions in the traditional CRP process.

In conventional controlled radical polymerization (CRP) or even advanced controlled radical polymerization, there is addition of all the monomers at once before addition of other reagents. Generally, these controlled radical polymerization methods are used for less reactive monomers and probably for smaller volume and the reaction in such situation will not lead to exotherm at laboratory scale. But these methods are not suitable for a more reactive monomer like HEA or for a larger scale reaction and will show exotherm. The conventional methods may also need longer addition time.

Therefore, there is a need for an improved process for polymerization of radically polymerizable and highly reactive monomers. Still further, there is a need for a process that can provide even better control on mitigation of exotherm and eliminate the requirement of having a large volume of reactive monomers in the reactor at a given time.

Hence, it is an object of the presently claimed invention to provide an improved process for preparing a polymer with excellent control on the exotherm that overcomes the above-mentioned drawbacks. Another object of the presently claimed invention is to provide an improved controlled radical polymerization process for the industrial scale synthesis of polymers.

SUMMARY

Surprisingly, it was found that the controlled feeding of a free radically polymerizable monomer during the process for preparing a polymer provides excellent control on the exotherm. Still further, the process not only provides an excellent control on the exotherm, but also good control over the molecular weight of the resulting polymer which is reflected in the narrow polydispersity of the polymer or copolymer and synthesis of a block copolymer that is obtained by the inventively claimed process.

Accordingly, in one aspect, the presently claimed invention is directed to a process for preparing a polymer comprising at least the steps of
i) preparing a polymerization mixture, comprising
   a) at least one transition metal catalyst,
   b) at least one reducing agent, and
   c) at least one atom-transfer radical polymerization initiator; and
ii) adding at least one free radically co-polymerizable monomer to the polymerization mixture to obtain the polymer; and
wherein the at least one free radically co-polymerizable monomer is added at a rate in the range of ≥0.08 wt. %/minute to ≤1.66 wt. %/minute, based on the total weight of the at least one free radically co-polymerizable monomer of step (ii).

The presently claimed invention is associated with at least one of the following advantages:
(i) the process described herein enables controlled polymerization of polymerizable monomers,
(ii) the process described herein provides excellent control on the exotherm and prevents uncontrolled exothermic explosion during the polymerization reaction,
(iii) the process described herein unlike traditional controlled radical polymerization process enables control on exotherm even during continuous addition of both oxygen and inhibitor into the reaction mixture,
(iv) the process described herein can be carried out in air sensitive conditions in existing plant set up,
(v) the process described herein provides a good control of the molecular weight of the resulting polymer,
(vi) the polymer obtained by the inventively claimed process has a narrow polydispersity,
(vii) the process described herein can be carried out as a semi-batch and a continuous process to suit the requirements of industrial scale production,
(viii) the process described herein is suitable also for polymerization of highly reactive monomers without the risk of uncontrolled exotherm,
(ix) the process described herein can be carried out with the use of lower amounts of catalyst and initiator, and
(x) the process described herein is a safe way to run polymerization of highly reactive monomers on a large scale.

Other objects, advantages and applications of the presently claimed invention will become apparent to those skilled in the art from the following detailed description.

DETAILED DESCRIPTION

Figure 1:
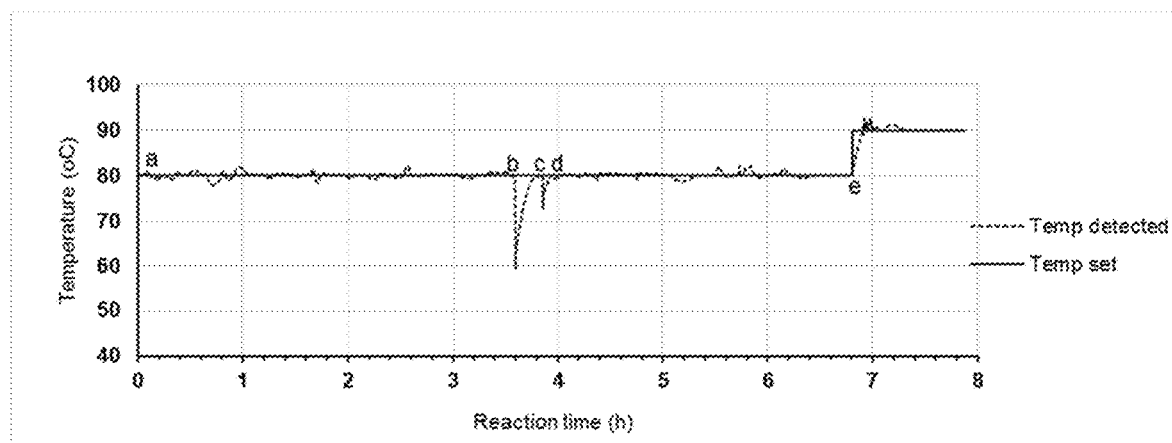
FIG. 1 presents a temperature profile that follows the reaction temperature during the polymerization reaction according to Example 1 (copolymer I). The temperature detected is the recorded temperature of the reaction mixture and the set temperature is the desired temperature of the reaction mixture. The starting point 'a' indicates the condition of initialization of feeding of the raw material 8 (Table 1) into a reaction flask containing 1-7 (Table 1) in the reaction flask at a set temperature 80° C.; 'b' indicates the addition of raw material 9 (Table 1) after step A is complete into the reaction flask; 'c' indicates addition of the reducing agent solution 10-11 (Table 1) into the reaction flask; 'd' indicates feeding of the monomer mixture 12-14 (Table 1) into the reaction flask; 'e' indicates the change of set temperature to 90° C.

The following detailed description is merely exemplary in nature and is not intended to limit the presently claimed invention or the application and uses of the presently claimed invention. Furthermore, there is no intention to be bound by any theory presented in the preceding technical field, background, summary or the following detailed description.

The terms "comprising", "comprises" and "comprised of" as used herein are synonymous with "including", "includes" or "containing", "contains", and are inclusive or open-ended and do not exclude additional, non-recited members, elements or method steps. It will be appreciated that the terms "comprising", "comprises" and "comprised of" as used herein comprise the terms "consisting of", "consists" and "consists of".

Furthermore, the terms "(a)", "(b)", "(c)", "(d)" etc. and the like in the description and in the claims, are used for distinguishing between similar elements and not necessarily for describing a sequential or chronological order. It is to be understood that the terms so used are interchangeable under appropriate circumstances and that the embodiments of the subject matter described herein are capable of operation in other sequences than described or illustrated herein. In case the terms "(A)", "(B)" and "(C)" or "(a)", "(b)", "(c)", "(d)", "(i)", "(ii)" etc. relate to steps of a method or use or assay there is no time or time interval coherence between the steps, that is, the steps may be carried out simultaneously or there may be time intervals of seconds, minutes, hours, days, weeks, months or even years between such steps, unless otherwise indicated in the application as set forth herein above or below.

In the following passages, different aspects of the subject matter are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

Reference throughout this specification to "one embodiment" or "an embodiment" means that a particular feature, structure or characteristic described in connection with the embodiment is included in at least one embodiment of the presently claimed invention. Thus, appearances of the phrases "in one embodiment" or "in an embodiment" in various places throughout this specification are not necessarily all referring to the same embodiment but may refer. Furthermore, the features, structures or characteristics may be combined in any suitable manner, as would be apparent to a person skilled in the art from this disclosure, in one or more embodiments. Furthermore, while some embodiments described herein include some, but not other features included in other embodiments, combinations of features of different embodiments are meant to be within the scope of the subject matter, and form different embodiments, as would be understood by those in the art. For example, in the appended claims, any of the claimed embodiments can be used in any combination.

Furthermore, the ranges defined throughout the specification include the end values as well, i.e. a range of 1 to 10 implies that both 1 and 10 are included in the range. For the avoidance of doubt, the applicant shall be entitled to any equivalents according to applicable law.

For the purposes of the presently claimed invention, a block polymer or a block copolymer is defined as a polymer or a copolymer formed, when two or more monomers cluster together and form 'blocks' of repeating units.

Reference throughout this specification to the term "copolymer" means that the copolymer comprises block or random copolymers obtainable by radical polymerization.

For the purposes of the presently claimed invention, a controlled or living polymerization process (CRP) is defined as a process, in which the chain transfer and termination reactions are essentially non-existent relative to the polymer propagation process.

For the purposes of the presently claimed invention, an ATRP process is defined as a polymerization process to provide highly uniform products having controlled structure and is also referred to as controlled radical polymerization (CRP).

For the purposes of the presently claimed invention, super advanced controlled radical polymerization or a super advanced ATRP is a polymerization process carried out in a monomer-starved condition.

For the purposes of the presently claimed invention, a monomer-starved condition is defined as a condition in the polymerization process in which there is metered addition of the monomers and the monomer is not added all at once at the beginning of the reaction.

For the purposes of the presently claimed invention, the term "monomer residue" is the residue of the monomer resulting from the polymerization of the corresponding unsaturated monomer.

For the purposes of the presently claimed invention, an atom-transfer radical polymerization initiator is defined as a molecule comprising one or more transferrable atoms or groups and may be considered as a contributor to the number of the growing polymer chain during the polymerization.

For the purposes of the presently claimed invention, a reducing agent is defined as an agent capable of donating one or more electrons to reduce an inactive metal catalyst to generate an active metal catalyst.

For the purposes of the presently claimed invention, the polydispersity or polydispersity index (PDI) is defined as a measure of the distribution of molecular mass in a given polymer.

For the purposes of the presently claimed invention, the mass-average molecular weight ($M_w$), number-average molecular weight ($M_n$), and molecular weight of the highest peak ($M_p$) are determined by means of gel permeation chromatography at 40° C., using a high-performance liquid chromatography pump and a refractive index detector. The eluent is tetrahydrofuran with an elution rate of 1 ml/min. The calibration is carried out by means of polystyrene standards.

For the purposes of the presently claimed invention, ' % by weight' or 'wt. %' as used in the presently claimed invention is with respect to the total weight of the coating composition. Further, the sum of wt.-% of all the compounds, as described hereinbelow, in the respective component adds up to 100 wt.-%.

The above-mentioned measurement techniques are well known to a person skilled in the art and therefore do not limit the presently claimed invention.

For the purposes of the presently claimed invention, simple ATRP processes with the components such as metal catalyst, reducing agent, initiator and monomers for preparation of polymers or copolymers can be referred in the following patents and patent applications: U.S. Pat. Nos. 5,763,546, 6,121,371, 7,019,082, U.S. 2009/534,827, U.S. Pat. Nos. 6,365,666 and 6,642,301, PCT/US2006/048656 and U.S. 2011/0082230. ATRP is considered as the preferred process for controlled/living polymerization of radically co-polymerizable monomers. The general mechanism and detailed description of polymerization by ATRP processes can be referred in U.S. 8, 822,610.

A conventional ATRP process requires a high catalyst concentration, often about 0.1 M in bulk monomer polymerization reactions. The high levels of catalyst employed in the initial ATRP reactions were required to overcome the effects of unavoidable increase in the concentration of the higher oxidation state catalyst due to unavoidable radical-radical termination reactions. Also, special handling procedures are required to remove all the oxygen and oxidants from the systems prior to the addition of the rapidly oxidizable catalyst. The energy used in these purification processes and/or the need of deoxygenated systems contributes to the generation of chemical waste and added costs. These are the major factors which constrain the commercial application of ATRP. In the recent advances, as described in WO 2007/075817, efforts were made to reduce the concentration of the catalyst used by addition of a reducing agent or an initiator to continuously regenerate the lower oxidation state activator from the accumulating higher oxidation state activator. However, this procedure has some disadvantages such as a requirement of maintaining a slow reaction for highly active monomers, need for precise temperature control and highly exothermic reactions. Processes to overcome these limitations, particularly at large scale, are disclosed hereinbelow.

Embodiments of the presently claimed invention meet the need in the art for a method of controlled radical polymerization which can reliably produce controlled polymer products with desirable properties by a super advanced controlled radical polymerization. A polymer obtainable by the process described herein has an excellent control on the exotherm, a good control over the molecular weight and a narrow polydispersity. The controlled polymer products obtained by the process described herein have a multitude of applications such as coatings, detergents and surfactants, paints, pigments, adhesives, lubricants and bio-applications. Further, the methods/process described herein may be practiced on small, large or commercial scale.

Accordingly, an aspect of the presently claimed invention relates to a process for preparing a polymer comprising at least the steps of:

i) preparing a polymerization mixture comprising
   a) at least one transition metal catalyst,
   b) at least one reducing agent, and
   c) at least one atom-transfer radical polymerization initiator; and ii) adding at least one free radically co-polymerizable monomer to the polymerization mixture to obtain the polymer; and wherein the at least one free radically co-polymerizable monomer is added at a rate in the range of ≥0.08 wt. %/minute to ≤1.66 wt. %/minute, based on the total weight of the at least one free radically co-polymerizable monomer of step (ii).

The rate of addition of the at least one free radically co-polymerizable monomer in the range of ≥0.08 wt. %/minute to ≤1.66 wt. %/minute, based on the total weight of the at least one free radically co-polymerizable monomer of step (ii) may be constant or can vary in the range described during the total time of addition of the monomer.

In an embodiment of the presently claimed invention, the (a) at least one transition metal catalyst is a transition metal-halide catalyst.

In a preferred embodiment of the presently claimed invention, the metal halide catalyst is inactive by itself to generate a radical.

In another preferred embodiment of the presently claimed invention, the metal halide catalyst is active.

In a preferred embodiment of the presently claimed invention, the transition metal-halide catalyst is selected from the group consisting of iron chloride, iron bromide, iron iodide, ruthenium chloride, ruthenium bromide, ruthenium iodide, copper chloride, copper bromide and copper iodide. In a more preferred embodiment of the presently claimed invention, the transition metal-halide catalyst is selected from the group consisting of copper chloride, copper bromide and copper iodide.

In another preferred embodiment of the presently claimed invention, the (a) at least one transition metal catalyst is added in an amount in the range of from ≥0.1 ppm to ≤250 ppm. In a more preferred embodiment of the presently claimed invention, the (a) at least one transition metal catalyst is added in an amount in the range of from ≥1 ppm to ≤200 ppm. In a most preferred embodiment of the presently claimed invention, the (a) at least one transition metal catalyst is added in an amount in the range of from ≥1 ppm to ≤150 ppm. In a specifically most preferred embodiment of the presently claimed invention, the (a) at least one transition metal catalyst is added in an amount in the range of from ≥5 ppm to ≤100 ppm.

In another embodiment of the presently claimed invention, the (b) at least one reducing agent is selected from the group consisting of tin 2-ethylhexanoate, sulfites, bisulfites, thiosulfites, mercaptans, hydroxylamines, amines, hydrazines, phenylhydrazines, hydrazones, hydroquinones, food preservatives, flavonoids, beta carotene, vitamin A, C-tocopherols, vitamin E, propyl gallate, octyl gallate, propionic acids, ascorbic acid, sorbates, reducing sugars, sugars comprising an aldehyde group, glucose, lactose, fructose, dextrose, potassium tartrate, nitrites, dextrin, aldehydes, glycine and antioxidants.

In yet another embodiment of the presently claimed invention, the (b) at least one reducing agent is a free radical initiator.

In a preferred embodiment of the presently claimed invention, the free radical initiator is selected from the group consisting of ammonium persulfate, hydrogen peroxide, acetyl peroxide, cumyl peroxide, tert-butyl peroxide, propionyl peroxide, benzoyl peroxide, chlorobenzoyl peroxide, dichlorobenzoyl peroxide, bromomethylbenzoyl peroxide, lauroyl peroxide, sodium persulfate, potassium persulfate, diisopropyl peroxycarbonate, tetralin hydroperoxide, 1-phenyl-2-methylpropyl-1-hydroperoxide, tert-butylhydroperoxide pertriphenylacetate, tert-butyl performate, tertbutyl peracetate, tert-butyl perbenzoate, tert-butyl perphenylacetate, tert-butyl permethoxyacetate, tert-butyl per-N-(3-toluyl)carbamate, 2,2'-azobispropane, 2,2'-dichloro-2,2'-azobispropane, 1,1'-azo(methylethyl) diacetate, 2,2'-azobis(2-amidinopropan) hydrochloride, 2,2'-azobis (2-amidinopropane) nitrate, 2,2'-azobisisobutane, 2,2'-azobisisobutylamide, 2,2'-azobisisobutyronitrile, methyl-2,2'-azobis-2-methylpropionate, 2,2'-dichloro-2,2'-azobisbutane, 2,2'-azobis-2-methylbutyronitrile, 2,2'-azobis-2-methylpropionitrile, ethyl-2-bromo-isobutyrate, dimethyl-2,2'-azobisisobutyrate, 1,1'-azobis(sodium 1-methylbutyronitrile-3-sulfonate), 2-(4-methylphenylazo)-2-methylmalonodinitrile, 4,4'-azobis-4-cyanovaleric acid, 3,5-dihydroxymethylphenylazo-2-methylmalonodinitrile, 2-(4-bromophenylazo)-2-allylmalonodinitrile, 2,2'-azobis-2-methylvaleronitrile, dimethyl 4,4'-azobis-4-cyanovalerate, 2,2'-azobis-2,4-dimethylvaleronitrile, 2,2'-azobis-4-methoxy-2,4-dimethylvaleronitrile, 1,1'-azobiscyclohexanenitrile, 2,2'-azobis-2-propylbutyronitrile, 1,1'-azobis-chlorophenylethane, 1,1'-azobis-1-cyclohexanecarbonitrile, 1,1'-azobis-1-cycloheptanenitrile, 1,1'-azobis-1-phenylethane, 1,1'-azobiscumene, ethyl 4-nitrophenylazobenzylcyanoacetate, phenylazodiphenylmethane, phenylazotriphenylmethane, 4-nitrophenylazotriphenylmethane, 1'-azobis-1,2-diphenylethane, poly(bisphenol-4,4'-azobis-4-cyanopentanoate), poly(tetraethylene glycol-2,2'-azobisisobutyrate), 1,4-bis(pentaethylene)-2-tetrazene, 1,4-dimethoxycarbonyl-1,4-dipheny-1-2-tetrazene and mixtures thereof.

In a more preferred embodiment of the presently claimed invention, the free radical initiator is selected from the group consisting of 2,2'-azobispropane, 2,2'-dichloro-2,2'-azobispropane, 1,1'-azo(methylethyl)diacetate, 2,2'-azobis(2-amidinopropan)hydrochloride, 2,2'-azobis(2-amidinopropane) nitrate, 2,2'-azobisisobutane, 2,2'-azobisisobutylamide, 2,2'-azobisisobutyronitrile, methyl-2,2'-azobis-2-methylpropionate, 2,2'-dichloro-2,2'-azobisbutane, 2,2'-azobis-2-methylbutyronitrile, 2,2'-azobis-2-methylpropionitrile, ethyl-2-bromo-isobutyrate, dimethyl-2,2'-azobisisobutyrate, 1,1'-azobis(sodium 1-methylbutyronitrile-3-sulfonate), 2-(4-methylphenylazo)-2-methylmalonodinitrile, 4,4'-azobis-4-cyanovaleric acid, 3,5-dihydroxymethylphenylazo-2-methylmalonodinitrile, 2-(4-bromophenylazo)-2-allylmalonodinitrile, 2,2'-azobis-2-methylvaleronitrile, dimethyl 4,4'-azobis-4-cyanovalerate, 2,2'-azobis-2,4-dimethylvaleronitrile, 2,2'-azobis-4-methoxy-2,4-dimethylvaleronitrile, 1,1'-azobiscyclohexanenitrile, 2,2'-azobis-2-propylbutyronitrile, 1,1'-azobis-chlorophenylethane, 1,1'-azobis-1-cyclohexanecarbonitrile, 1,1'-azobis-1-cycloheptanenitrile, 1,1'-azobis-1-phenylethane, 1,1'-azobiscumene, ethyl 4-nitrophenylazobenzylcyanoacetate, phenylazodiphenylmethane, phenylazotriphenylmethane, 4-nitrophenylazotriphenylmethane, 1'-azobis-1,2-diphenylethane, poly(bisphenol-4,4'-azobis-4-cyanopentanoate), poly(tetraethylene glycol-2,2'-azobisisobutyrate), 1,4-bis(pentaethylene)-2-tetrazene, 1,4-dimethoxycarbonyl-1,4-dipheny-1-2-tetrazene and mixtures thereof.

In a most preferred embodiment of the presently claimed invention, the free radical initiator is selected from the group consisting of ,2'-azobisisobutylamide, 2,2'-azobisisobutyronitrile, methyl-2,2'-azobis-2-methylpropionate, 2,2'-dichloro-2,2'-azobisbutane, 2,2'-azobis-2-methylbutyronitrile, 2,2'-azobis-2-methylpropionitrile, ethyl-2-bromo-isobutyrate, dimethyl-2,2'-azobisisobutyrate and 1,1'-azobis(sodium 1-methylbutyronitrile-3-sulfonate).

In another preferred embodiment of the presently claimed invention, the (b) at least one reducing agent is added in an amount in the range of from ≥100 ppm to ≤1000,000 ppm. In a more preferred embodiment of the presently claimed invention, the (b) at least one reducing agent is added in an amount in the range of from ≥100 ppm to ≤100,000 ppm. In a most preferred embodiment of the presently claimed invention, the (b) at least one reducing agent is added in an amount in the range of from ≥100 ppm to ≤50,000 ppm. In a specifically most preferred embodiment of the presently claimed invention, the (b) at least one reducing agent is added in an amount in the range of from ≥1000 ppm to ≤50,000 ppm, in each case based on the total amount of the final polymer weight.

In another embodiment of the presently claimed invention, the c) at least one atom-transfer radical polymerization initiator is selected from the group consisting of sulfonyl halides, alkyl halides and substituted alkyl halides.

In a preferred embodiment of the presently claimed invention, the alkyl halides and substituted alkyl halides are selected from the group consisting of benzyl bromide, benzyl chloride, ethyl bromoacetate, diethyl-2-bromo-2-methylmalonate, ethyl-2-bromoisobutyrate, methyl-2-bromopropionate, ethyl-2-chloroisobutryrate and 1,2-bis(2-bromoisobutyryloxy)ethane, toluenesulfonyl chloride. In a more preferred embodiment of the presently claimed invention, the alkyl halides and substituted alkyl halides are selected from the group consisting of diethyl-2-bromo-2-methylmalonate, ethyl-2-bromoisobutyrate, methyl-2-bromopropionate, ethyl-2-chloroisobutryrate and 1,2-bis(2-bromoisobutyryloxy)ethane, toluenesulfonyl chloride.

In another preferred embodiment of the presently claimed invention, the (c) at least one atom-transfer radical polymerization initiator is added in an amount in the range of from ≥1 ppm to ≤500,000 ppm. In a more preferred embodiment of the presently claimed invention, the c) at least one atom-transfer radical polymerization initiator is added in an amount in the range of from ≥10 ppm to ≤500,000 ppm. In a most preferred embodiment of the presently claimed invention, the c) at least one atom-transfer radical polymerization initiator is added in an amount in the range of from ≥100 ppm to ≤500,000 ppm. In a specifically most preferred embodiment of the presently claimed invention, the c) at least one atom-transfer radical polymerization initiator is added in an amount in the range of from ≥1000 ppm to ≤500,000 ppm, in each case with respect to the total amount of the final polymer weight.

In a preferred embodiment of the presently claimed invention, the at least one free radically copolymerizable monomer is an ethylenically unsaturated monomer.

In a preferred embodiment of the presently claimed invention, the at least one free radically copolymerizable monomer is hydrophobic. In another preferred embodiment of the presently claimed invention, the at least one free radically co-polymerizable monomer is hydrophilic.

In another preferred embodiment of the presently claimed invention, the ethylenically unsaturated monomer is selected from the group consisting of styrene, alpha-methyl styrene, methyl acrylate, ethyl acrylate, butyl acrylate, isobutyl acrylate, dodecyl acrylate, n-octyl acrylate, 2-chloroethyl acrylate, carboxyethyl acrylate, phenyl acrylate, benzyl acrylate, methyl alphachloroacrylate, methyl methacrylate, ethyl methacrylate, butyl methacrylate, isobutyl methacrylate, dodecyl methacrylate, n-octyl methacrylate, 2-chloroethyl methacrylate, carboxyethyl methacrylate, phenyl methacrylate, methyl alphachloromethacrylate, benzyl methacrylate, butadiene, isoprene, methacrylonitrile, acrylonitrile, vinyl methyl ether, vinyl isobutyl ether, vinyl ethyl ether, vinyl acetate, vinyl propionate, vinyl benzoate, vinyl butyrate, vinyl methyl ketone, vinyl hexyl ketone, methyl isopropenyl ketone, vinylidene chloride, vinylidene chlorofluoride, N-vinyl pyrrolidone, N-vinylcarbazole, acrylic acid, methacrylic acid, acrylamide, methacrylamide, vinyl pyridine, vinylpyrrolidone, vinyl-N-methylpyridinium chloride, vinyl naphthalene, p-chlorostyrene, vinyl chloride, vinyl bromide, vinyl fluoride, ethylene, propylene, butylene, isobutylene, 2-ethylbutyl acrylate, 2-ethylbutyl methacrylate, 2-ethylhexyl acrylate, 2-ethylhexyl methacrylate, 2-hydroxyethyl acrylate, 2-hydroxyethyl methacrylate, 2-hydroxypropyl acrylate, 2-hydroxypropyl methacrylate, 3-hydroxypropyl acrylate, 3-hydroxypropyl methacrylate, 3-hydroxybutyl acrylate, 3-hydroxybutyl methacrylate, 4-hydroxybutyl acrylate, 4-hydroxybutyl methacrylate, 6-hydroxyhexyl acrylate, 6-hydroxyhexyl methacrylate, 3-hydroxy-2-ethylhexyl acrylate, 3-hydroxy-2-ethylhexyl methacrylate, glycidyl acrylate, glycidyl methacrylate, and mixtures thereof.

In a yet another preferred embodiment of the presently claimed invention, the ethylenically unsaturated monomer is selected from the group consisting of styrene, alpha-methyl styrene, methyl acrylate, ethyl acrylate, butyl acrylate, isobutyl acrylate, dodecyl acrylate, n-octyl acrylate, 2-chloroethyl acrylate, carboxyethyl acrylate, phenyl acrylate, benzyl acrylate, methyl alphachloroacrylate, methyl methacrylate, ethyl methacrylate, butyl methacrylate, isobutyl methacrylate, dodecyl methacrylate, n-octyl methacrylate, 2-chloroethyl methacrylate, carboxyethyl methacrylate, phenyl methacrylate, methyl alphachloromethacrylate, benzyl methacrylate, methacrylonitrile, acrylonitrile, N-vinyl pyrrolidone, N-vinylcarbazole, acrylic acid, methacrylic acid, acrylamide, methacrylamide, vinylpyridine, vinylpyrrolidone, vinyl-N-methylpyridinium chloride, vinyl naphthalene, vinyl fluoride, ethylene, 2-ethylbutyl acrylate, 2-ethylbutyl methacrylate, 2-ethylhexyl acrylate, 2-ethylhexyl methacrylate, 2-hydroxyethyl acrylate, 2-hydroxyethyl methacrylate, 2-hydroxypropyl acrylate, 2-hydroxypropyl methacrylate, 3-hydroxypropyl acrylate, 3-hydroxypropyl methacrylate, 3-hydroxybutyl acrylate, 3-hydroxybutyl methacrylate, 4-hydroxybutyl acrylate, 4-hydroxybutyl methacrylate, 6-hydroxyhexyl acrylate, 6-hydroxyhexyl methacrylate, 3-hydroxy-2-ethylhexyl acrylate, 3-hydroxy-2-ethylhexyl methacrylate, glycidyl acrylate, glycidyl methacrylate, and mixtures thereof.

In a yet another preferred embodiment of the presently claimed invention, the ethylenically unsaturated monomer is selected from the group consisting of styrene, alpha-methyl styrene, methyl acrylate, ethyl acrylate, butyl acrylate, isobutyl acrylate, dodecyl acrylate, n-octyl acrylate, methyl methacrylate, ethyl methacrylate, butyl methacrylate, isobutyl methacrylate, dodecyl methacrylate, n-octyl methacrylate, phenyl methacrylate, methyl alphachloromethacrylate, benzyl methacrylate, methacrylonitrile, acrylonitrile, N-vinyl pyrrolidone, N-vinylcarbazole, acrylic acid, methacrylic acid, acrylamide, methacrylamide, vinylpyridine, vinylpyrrolidone, vinyl naphthalene, vinyl fluoride, ethylene, 2-ethylhexyl acrylate, 2-ethylhexyl methacrylate, 2-hydroxyethyl acrylate, 2-hydroxyethyl methacrylate, 2-hydroxypropyl acrylate, 2-hydroxypropyl methacrylate, 3-hydroxypropyl acrylate, 3-hydroxypropyl methacrylate, 3-hydroxybutyl acrylate, 3-hydroxybutyl methacrylate, 4-hydroxybutyl acrylate, 4-hydroxybutyl methacrylate, glycidyl acrylate, glycidyl methacrylate, and mixtures thereof.

In a yet another preferred embodiment of the presently claimed invention, the ethylenically unsaturated monomer is selected from the group consisting of styrene, butyl acrylate, methyl methacrylate, butyl methacrylate, 2-ethylhexyl acrylate, 2-ethylhexyl methacrylate, 2-hydroxyethyl acrylate, 2-hydroxyethyl methacrylate, 2-hydroxypropyl acrylate, 2-hydroxypropyl methacrylate, 3-hydroxypropyl acrylate, 3-hydroxypropyl methacrylate, glycidyl methacrylate, and mixtures thereof.

In an embodiment of the presently claimed invention, the at least one free radically co-polymerizable monomer is added intermittently or continuously.

In a preferred embodiment of the presently claimed invention, the at least one free radically copolymerizable monomer is added at a rate in the range of ≥0.17 wt. %/minute to ≤0.83 wt. %/minute, based on the total weight of the at least one free radically co-polymerizable monomer. In a more preferred embodiment of the presently claimed invention, the at least one free radically copolymerizable monomer is added at a rate in the range of ≥0.25 wt. %/minute to ≤0.50 wt. %/minute, based on the total weight of the at least one free radically co-polymerizable monomer. The rate of addition of the at least one free radically co-polymerizable monomer in each case may be constant or can vary within the described range during the total time of addition of the monomer.

In an embodiment of the presently claimed invention, the molar ratio of the at least one free radically co-polymerizable monomer to the at least one transition metal catalyst is in the range of ≥10:1.0 to ≤500,000:1.0. In a preferred embodiment of the presently claimed invention, the molar ratio of the at least one free radically co-polymerizable monomer to the at least one transition metal catalyst is in the range of ≥100:1.0 to ≤250,000:1.0. In a more preferred embodiment of the presently claimed invention, the molar ratio of the at least one free radically copolymerizable monomer to the at least one transition metal catalyst is in the range of ≥100:1 to ≤100,000:1.

In an embodiment of the presently claimed invention, the molar ratio of the at least one free radically co-polymerizable monomer to the at least one atom-transfer radical polymerization initiator is in the range of ≥1.0:1.0 to ≤10,000:1.0. In a preferred embodiment of the presently claimed invention, the molar ratio of the at least one free radically co-polymerizable monomer to the at least one atom-transfer radical polymerization initiator is in the range of ≥2.0:1.0 to ≤ 1,000:1.0. In a more preferred embodiment of the presently claimed invention, the molar ratio of the at least one free radically co-polymerizable monomer to the at least one to atom-transfer radical polymerization initiator is in the range of ≥2.0:1.0 to ≤500:1.0.

In an embodiment of the presently claimed invention, the molar ratio of the at least one transition metal catalyst to the at least one atom-transfer radical polymerization initiator is in the range of ≥0.0005:1.0 to ≤50:1.0. In a preferred embodiment of the presently claimed invention, the molar ratio of the at least one transition metal catalyst to the at least one atom-transfer radical polymerization initiator is in the range of ≥0.0005:1.0 to ≤5:1.0. In a more preferred embodiment of the presently claimed invention, the molar ratio of the at least one transition metal catalyst to the at least one atom-transfer radical polymerization initiator is in the range of ≥0.0005:1.0 to ≤ 0.5:1.0.

In an embodiment of the presently claimed invention, the molar ratio of the at least one free radical initiator to the at least one atom-transfer radical polymerization initiator added is in the range of ≥0.005:1.0 to ≤50.0:1.0. In a preferred embodiment of the presently claimed invention, the molar ratio of the at least one free radical initiator to the at least one atom-transfer radical polymerization initiator is in the range of ≥0.005:1.0 to ≤5.0:1.0 In a more preferred embodiment of the presently claimed invention, the molar ratio of the at least one free radical initiator to the at least one atom-transfer radical polymerization initiator is in the range of ≥0.005:1 to ≤1:1.

In an embodiment of the presently claimed invention, the polymerization mixture further comprises at least one solvent. In a preferred embodiment of the presently claimed invention, the at least one solvent is selected from the group consisting of methanol, ethanol, n-propanol, isopropanol, butanol, butoxyethanol, acetone, butanone, pentanone, hexanone, methyl ethyl ketone, methyl isobutyl ketone, ethyl acetate, butyl acetate, amyl acetate, methoxy propyl acetate, tetrahydrofuran, diethyl ether, ethylene glycol, polyethylene glycol and mixtures thereof.

For the purposes of the presently claimed invention, suitable ligands may be used in the polymerization reaction for the formation of polymer or copolymer. The ligands are capable of forming a complex with the transition metal catalyst during the polymerization step (ii). The ligands drive the polymerization reaction to the effect that it may aid a mixture of the various components in step (i) on a molecular level. Representative examples of ligands include, but are not limited to, tris(2-pyridylmethyl)amine (TPMA), tris [2-(dimethylamino)ethyl]amine, N,N,N',N", N"-pentmethyldiethyletriamine, N,N,N',N",N'" N""-hexamethyltriethylenetetramine, 4,4'-dinonyl bipyridine and bipyridine.

In a preferred embodiment of the presently claimed invention, the polymerization of the at least one free radically co-polymerizable monomer to a polymer is performed as a biphasic polymerization process, an emulsion polymerization process, a mini-emulsion polymerization process, a microemulsion polymerization process, a reverse emulsion polymerization process or a suspension polymerization process.

In a yet another preferred embodiment of the presently claimed invention, the polymerization of the at least one free radically co-polymerizable monomer to a polymer allows conversion of at least 90% of the total amount of the free radically co-polymerizable monomer. In a more preferred embodiment of the presently claimed invention, the polymerization of the at least one free radically co-polymerizable monomer to a polymer allows conversion of at least 95% of the total amount of the free radically co-polymerizable monomer. In a most preferred embodiment of the presently claimed invention, the polymerization of the at least one free radically co-polymerizable monomer to a polymer allows conversion of at least 99% of the total amount of the free radically co-polymerizable monomer.

In another embodiment of the presently claimed invention, the temperature of the polymerization step is maintained in the range of ≥35° C. to ≤150° C. In a preferred embodiment of the presently claimed invention, the temperature of the polymerization step is maintained in the range of ≥40° C. to ≤110° C.

In an embodiment of the presently claimed invention, the degree of change in the temperature from a target temperature during the monomer addition step (ii) is in the range of ≥−10.0% to ≤+10.0%. In a preferred embodiment of the presently claimed invention, the degree of change in the temperature from a target temperature during the polymerization step (ii) is in the range of ≥−5.0% to ≤+5.0%.

In a preferred embodiment of the presently claimed invention, the polymerization step is conducted within a time period in the range of ≥1 hour to ≤25 hours. In a more preferred embodiment of the presently claimed invention, the polymerization step is conducted within a time period in the range of ≥2 hours to ≤15 hours.

In an embodiment of the presently claimed invention, a process for preparing a diblock polymer of formula AB comprises at least the steps of:
  (a) super advanced controlled radical polymerization or super advanced ATRP of a first reaction mixture comprising at least one free radically co-polymerizable monomer to form a first polymer block A;
  (b) super advanced controlled radical polymerization or super advanced ATRP of a second reaction mixture comprising at least one free radically co-polymerizable monomer to form a second polymer block B; and
    wherein the at least one free radically co-polymerizable monomer is added at a rate in the range of ≥0.08 wt. %/minute to ≤1.66 wt. %/minute, based on the total weight of the at least one free radically co-polymerizable monomer in step (a) or step (b); and
    wherein the at least one free radically co-polymerizable monomer in step (a) and step (b) is same or different.

The rate of addition of the at least one free radically co-polymerizable monomer in the range of ≥0.08 wt. %/minute to ≤1.66 wt. %/minute, based on the total weight of the at least one free radically co-polymerizable monomer in step (a) or step (b) may be constant or can vary in the range described during the total time of addition of the monomer.

In another embodiment of the presently claimed invention, the first reaction mixture in step (a) comprises at least one transition metal catalyst, at least one reducing agent, at least one atom-transfer radical polymerization initiator and at least one free radically co-polymerizable monomer.

In another embodiment of the presently claimed invention, the second reaction mixture in step (b) comprises at least one transition metal catalyst, at least one reducing agent, at least one atom-transfer radical polymerization initiator and at least one free radically co-polymerizable monomer. The selection of the components and their amounts in the first reaction mixture and second reaction mixture is according to other embodiments described herein.

In a preferred embodiment of the presently claimed invention, a process for preparing a polymer comprises at least the steps of:
- i) preparing a polymerization mixture comprising
  - a) at least one transition metal catalyst,
  - b) at least one reducing agent, and
  - c) at least one atom-transfer radical polymerization initiator; and
- ii) adding at least one free radically co-polymerizable monomer to the polymerization mixture to obtain the polymer; and
- wherein the at least one free radically co-polymerizable monomer is added at a rate in the range of ≥0.08 wt. %/minute to ≤1.66 wt. %/minute, based on the total weight of the at least one free radically co-polymerizable monomer of step (ii); and wherein the degree of change in the temperature from a target temperature during step (ii) is in the range of ≥−10.0% to ≤+10.0%.

In another preferred embodiment of the presently claimed invention, a process for preparing a polymer comprises at least the steps of:
- iii) preparing a polymerization mixture comprising
  - d) at least one transition metal catalyst,
  - e) at least one reducing agent, and
  - f) at least one atom-transfer radical polymerization initiator; and
- iv) adding at least one free radically co-polymerizable monomer to the polymerization mixture to obtain the polymer; and
- wherein the at least one free radically co-polymerizable monomer is added at a rate in the range of ≥0.08 wt. %/minute to ≤1.66 wt. %/minute, based on the total weight of the at least one free radically co-polymerizable monomer of step (ii); and
- wherein the degree of change in the temperature from a target temperature during step (ii) is in the range of ≥−10.0% to ≤+10.0%, and
- wherein the at least one free radically co-polymerizable monomer is an ethylenically unsaturated monomer and is selected from the group consisting of styrene, alpha-methyl styrene, methyl acrylate, ethyl acrylate, butyl acrylate, isobutyl acrylate, dodecyl acrylate, n-octyl acrylate, 2-chloroethyl acrylate, carboxyethyl acrylate, phenyl acrylate, benzyl acrylate, methyl alphachloroacrylate, methyl methacrylate, ethyl methacrylate, butyl methacrylate, isobutyl methacrylate, dodecyl methacrylate, n-octyl methacrylate, 2-chloroethyl methacrylate, carboxyethyl methacrylate, phenyl methacrylate, methyl alphachloromethacrylate, benzyl methacrylate, butadiene, isoprene, methacrylonitrile, acrylonitrile, vinyl methyl ether, vinyl isobutyl ether, vinyl ethyl ether, vinyl acetate, vinyl propionate, vinyl benzoate, vinyl butyrate, vinyl methyl ketone, vinyl hexyl ketone, methyl isopropenyl ketone, vinylidene chloride, vinylidene chlorofluoride, N-vinyl pyrrolidone, N-vinylcarbazole, acrylic acid, methacrylic acid, acrylamide, methacrylamide, vinyl pyridine, vinylpyrrolidone, vinyl-N-methylpyridinium chloride, vinyl naphthalene, p-chlorostyrene, vinyl chloride, vinyl bromide, vinyl fluoride, ethylene, propylene, butylene, isobutylene, 2-ethylbutyl acrylate, 2-ethylbutyl methacrylate, 2-ethylhexyl acrylate, 2-ethylhexyl methacrylate, 2-hydroxyethyl acrylate, 2-hydroxyethyl methacrylate, 2-hydroxypropyl acrylate, 2-hydroxypropyl methacrylate, 3-hydroxypropyl acrylate, 3-hydroxypropyl methacrylate, 3-hydroxybutyl acrylate, 3-hydroxybutyl methacrylate, 4-hydroxybutyl acrylate, 4-hydroxybutyl methacrylate, 6-hydroxyhexyl acrylate, 6-hydroxyhexyl methacrylate, 3-hydroxy-2-ethylhexyl acrylate, 3-hydroxy-2-ethylhexyl methacrylate, glycidyl acrylate, glycidyl methacrylate, and mixtures thereof.

In a yet another preferred embodiment of the presently claimed invention, a process for preparing a polymer comprises at least the steps of:
- v) preparing a polymerization mixture comprising
  - g) at least one transition metal catalyst,
  - h) at least one reducing agent, and
  - i) at least one atom-transfer radical polymerization initiator; and
- vi) adding at least one free radically co-polymerizable monomer to the polymerization mixture to obtain the polymer; and
- wherein the at least one free radically co-polymerizable monomer is added at a rate in the range of ≥0.08 wt. %/minute to ≤1.66 wt. %/minute, based on the total weight of the at least one free radically co-polymerizable monomer of step (ii); and
- wherein the degree of change in the temperature from a target temperature during step (ii) is in the range of ≥−10.0% to ≤+10.0%, and
- wherein the at least one free radically co-polymerizable monomer is an ethylenically unsaturated monomer and is selected from the group consisting of styrene, alpha-methyl styrene, methyl acrylate, ethyl acrylate, butyl acrylate, isobutyl acrylate, dodecyl acrylate, n-octyl acrylate, 2-chloroethyl acrylate, carboxyethyl acrylate, phenyl acrylate, benzyl acrylate, methyl alphachloroacrylate, methyl methacrylate, ethyl methacrylate, butyl methacrylate, isobutyl methacrylate, dodecyl methacrylate, n-octyl methacrylate, 2-chloroethyl methacrylate, carboxyethyl methacrylate, phenyl methacrylate, methyl alphachloromethacrylate, benzyl methacrylate, methacrylonitrile, acrylonitrile, N-vinyl pyrrolidone, N-vinylcarbazole, acrylic acid, methacrylic acid, acrylamide, methacrylamide, vinylpyridine, vinylpyrrolidone, vinyl-N-methylpyridinium chloride, vinyl naphthalene, vinyl fluoride, ethylene, 2-ethylbutyl acrylate, 2-ethylbutyl methacrylate, 2-ethylhexyl acrylate, 2-ethylhexyl methacrylate, 2-hydroxyethyl acrylate, 2-hydroxyethyl methacrylate, 2-hydroxypropyl acrylate, 2-hydroxypropyl methacrylate, 3-hydroxypropyl acrylate, 3-hydroxypropyl methacrylate, 3-hydroxybutyl acrylate, 3-hydroxybutyl methacrylate, 4-hydroxybutyl acrylate, 4-hydroxybutyl methacrylate, 6-hydroxyhexyl acrylate, 6-hydroxyhexyl methacrylate, 3-hydroxy-2-ethylhexyl acrylate, 3-hydroxy-2-ethylhexyl methacrylate, glycidyl acrylate, glycidyl methacrylate, and mixtures thereof.

In another preferred embodiment of the presently claimed invention, a process for preparing a polymer comprises at least the steps of:
- vii) preparing a polymerization mixture comprising
  - j) at least one transition metal catalyst,
  - k) at least one reducing agent, and
  - l) at least one atom-transfer radical polymerization initiator; and
- viii) adding at least one free radically co-polymerizable monomer to the polymerization mixture to obtain the polymer; and
- wherein the at least one free radically co-polymerizable monomer is added at a rate in the range of ≥0.08 wt. %/minute to ≤1.66 wt. %/minute, based on the total weight of the at least one free radically co-polymerizable monomer of step (ii); and wherein the degree of change in the temperature from a target temperature during step (ii) is in the range of ≥−10.0% to ≤+10.0%, and wherein the at least one free radically co-polymerizable monomer is an ethylenically unsaturated monomer and is selected from the group consisting of styrene, alpha-methyl styrene, methyl acrylate, ethyl acrylate, butyl acrylate, isobutyl acrylate, dodecyl acrylate, n-octyl acrylate, methyl methacrylate, ethyl methacrylate, butyl methacrylate, isobutyl methacrylate, dodecyl methacrylate, n-octyl methacrylate, phenyl methacrylate, methyl alphachloromethacrylate, benzyl methacrylate, methacrylonitrile, acrylonitrile, N-vinyl pyrrolidone, N-vinylcarbazole, acrylic acid, methacrylic acid, acrylamide, methacrylamide, vinylpyridine, vinylpyrrolidone, vinyl naphthalene, vinyl fluoride, ethylene, 2-ethylhexyl acrylate, 2-ethylhexyl methacrylate, 2-hydroxyethyl acrylate, 2-hydroxyethyl methacrylate, 2-hydroxypropyl acrylate, 2-hydroxypropyl methacrylate, 3-hydroxypropyl acrylate, 3-hydroxypropyl methacrylate, 3-hydroxybutyl acrylate, 3-hydroxybutyl methacrylate, 4-hydroxybutyl acrylate, 4-hydroxybutyl methacrylate, glycidyl acrylate, glycidyl methacrylate, and mixtures thereof.

In another preferred embodiment of the presently claimed invention, a process for preparing a polymer comprises at least the steps of:

ix) preparing a polymerization mixture comprising m) at least one transition metal catalyst, n) at least one reducing agent, and o) at least one atom-transfer radical polymerization initiator; and x) adding at least one free radically co-polymerizable monomer to the polymerization mixture to obtain the polymer; and wherein the at least one free radically co-polymerizable monomer is added at a rate in the range of ≥0.08 wt. %/minute to ≤1.66 wt. %/minute, based on the total weight of the at least one free radically co-polymerizable monomer of step (ii); and wherein the degree of change in the temperature from a target temperature during step (ii) is in the range of ≥−10.0% to ≤+10.0%, and wherein the at least one free radically co-polymerizable monomer is an ethylenically unsaturated monomer and is selected from the group consisting of styrene, butyl acrylate, methyl methacrylate, butyl methacrylate, 2-ethylhexyl acrylate, 2-ethylhexyl methacrylate, 2-hydroxyethyl acrylate, 2-hydroxyethyl methacrylate, 2-hydroxypropyl acrylate, 2-hydroxypropyl methacrylate, 3-hydroxypropyl acrylate, 3-hydroxypropyl methacrylate, glycidyl methacrylate, and mixtures thereof.

In another preferred embodiment of the presently claimed invention, a process for preparing a polymer comprises at least the steps of:

i) preparing a polymerization mixture comprising a) at least one transition metal catalyst, b) at least one reducing agent, and c) at least one atom-transfer radical polymerization initiator; and ii) adding at least one free radically co-polymerizable monomer to the polymerization mixture to obtain the polymer; and wherein the at least one free radically co-polymerizable monomer is added at a rate in the range of ≥0.08 wt. %/minute to ≤1.66 wt. %/minute, based on the total weight of the at least one free radically co-polymerizable monomer of step (ii); and wherein the degree of change in the temperature from a target temperature during step (ii) is in the range of 2-5.0% to ≤+5.0%.

In a yet another preferred embodiment of the presently claimed invention, a process for preparing a polymer comprises at least the steps of:

iii) preparing a polymerization mixture comprising d) at least one transition metal catalyst, e) at least one reducing agent, and f) at least one atom-transfer radical polymerization initiator; and iv) adding at least one free radically co-polymerizable monomer to the polymerization mixture to obtain the polymer; and wherein the at least one free radically co-polymerizable monomer is added at a rate in the range of ≥0.08 wt. %/minute to ≤1.66 wt. %/minute, based on the total weight of the at least one free radically co-polymerizable monomer of step (ii); and wherein the degree of change in the temperature from a target temperature during step (ii) is in the range of ≥−5.0% to ≤+5.0%, and wherein the at least one free radically co-polymerizable monomer is an ethylenically unsaturated monomer and is selected from the group consisting of styrene, alpha-methyl styrene, methyl acrylate, ethyl acrylate, butyl acrylate, isobutyl acrylate, dodecyl acrylate, n-octyl acrylate, 2-chloroethyl acrylate, carboxyethyl acrylate, phenyl acrylate, benzyl acrylate, methyl alphachloroacrylate, methyl methacrylate, ethyl methacrylate, butyl methacrylate, isobutyl methacrylate, dodecyl methacrylate, n-octyl methacrylate, 2-chloroethyl methacrylate, carboxyethyl methacrylate, phenyl methacrylate, methyl alphachloromethacrylate, benzyl methacrylate, methacrylonitrile, acrylonitrile, N-vinyl pyrrolidone, N-vinylcarbazole, acrylic acid, methacrylic acid, acrylamide, methacrylamide, vinylpyridine, vinylpyrrolidone, vinyl-N-methylpyridinium chloride, vinyl naphthalene, vinyl fluoride, ethylene, 2-ethylbutyl acrylate, 2-ethylbutyl methacrylate, 2-ethylhexyl acrylate, 2-ethylhexyl methacrylate, 2-hydroxyethyl acrylate, 2-hydroxyethyl methacrylate, 2-hydroxypropyl acrylate, 2-hydroxypropyl methacrylate, 3-hydroxypropyl acrylate, 3-hydroxypropyl methacrylate, 3-hydroxybutyl acrylate, 3-hydroxybutyl methacrylate, 4-hydroxybutyl acrylate, 4-hydroxybutyl methacrylate, 6-hydroxyhexyl acrylate, 6-hydroxyhexyl methacrylate, 3-hydroxy-2-ethylhexyl acrylate, 3-hydroxy-2-ethylhexyl methacrylate, glycidyl acrylate, glycidyl methacrylate, and mixtures thereof.

In a yet another preferred embodiment of the presently claimed invention, a process for preparing a polymer comprises at least the steps of:

v) preparing a polymerization mixture comprising g) at least one transition metal catalyst, h) at least one reducing agent, and i) at least one atom-transfer radical polymerization initiator; and vi) adding at least one free radically co-polymerizable monomer to the polymerization mixture to obtain the polymer; and wherein the at least one free radically co-polymerizable monomer is added at a rate in the range of ≥0.08 wt. %/minute to ≤1.66 wt. %/minute, based on the total weight of the at least one free radically co-polymerizable monomer of step (ii); and wherein the degree of change in the temperature from a target temperature during step (ii) is in the range of ≥−5.0% to ≤+5.0%, and wherein the at least one free radically co-polymerizable monomer is an ethylenically unsaturated monomer and is selected from the group consisting of styrene, alpha-methyl styrene, methyl acrylate, ethyl acrylate, butyl acrylate, isobutyl acrylate, dodecyl acrylate, n-octyl acrylate, methyl methacrylate, ethyl methacrylate, butyl methacrylate, isobutyl methacrylate, dodecyl methacrylate, n-octyl methacrylate, phenyl methacrylate, methyl alphachloromethacrylate, benzyl methacrylate, methacrylonitrile, acrylonitrile, N-vinyl pyrrolidone, N-vinylcarbazole, acrylic acid, methacrylic acid, acrylamide, methacrylamide, vinylpyridine, vinylpyrrolidone, vinyl naphthalene, vinyl fluoride, ethylene, 2-ethylhexyl acrylate, 2-ethylhexyl methacrylate, 2-hydroxyethyl acrylate, 2-hydroxyethyl methacrylate, 2-hydroxypropyl acrylate, 2-hydroxypropyl methacrylate, 3-hydroxypropyl acrylate, 3-hydroxypropyl methacrylate, 3-hydroxybutyl acrylate, 3-hydroxybutyl methacrylate, 4-hydroxybutyl acrylate, 4-hydroxybutyl methacrylate, glycidyl acrylate, glycidyl methacrylate, and mixtures thereof.

In a yet another preferred embodiment of the presently claimed invention, a process for preparing a polymer comprises at least the steps of:

vii) preparing a polymerization mixture comprising j) at least one transition metal catalyst, k) at least one reducing agent, and l) at least one atom-transfer radical polymerization initiator; and viii) adding at least one free radically co-polymerizable monomer to the polymerization mixture to obtain the polymer; and wherein the at least one free radically co-polymerizable monomer is added at a rate in the range of ≥0.08 wt. %/minute to ≤1.66 wt. %/minute, based on the total weight of the at least one free radically co-polymerizable monomer of step (ii); and wherein the degree of change in the temperature from a target temperature during step (ii) is in the range of ≥−5.0% to ≤+5.0%, and wherein the at least one free radically co-polymerizable monomer is an ethylenically unsaturated monomer and is selected from the group consisting of styrene, butyl acrylate, methyl methacrylate, butyl methacrylate, 2-ethylhexyl acrylate, 2-ethylhexyl methacrylate, 2-hydroxyethyl acrylate, 2-hydroxyethyl methacrylate, 2-hydroxypropyl acrylate, 2-hydroxypropyl methacrylate, 3-hydroxypropyl acrylate, 3-hydroxypropyl methacrylate, glycidyl methacrylate, and mixtures thereof.

In another preferred embodiment of the presently claimed invention, a process for preparing a polymer comprises at least the steps of:

i) preparing a polymerization mixture comprising a) at least one transition metal catalyst, b) at least one reducing agent, and c) at least one atom-transfer radical polymerization initiator; and ii) adding at least one free radically co-polymerizable monomer to the polymerization mixture to obtain the polymer; and wherein the at least one free radically co-polymerizable monomer is added at a rate in the range of ≥0.08 wt. %/minute to ≤1.66 wt. %/minute, based on the total weight of the at least one free radically co-polymerizable monomer of step (ii); and wherein the at least one free radically co-polymerizable monomer is added intermittently or continuously.

In another preferred embodiment of the presently claimed invention, a process for preparing a polymer comprises at least the steps of:

i) preparing a polymerization mixture comprising a) at least one transition metal catalyst, b) at least one reducing agent, and c) at least one atom-transfer radical polymerization initiator; and ii) adding at least one free radically co-polymerizable monomer to the polymerization mixture to obtain the polymer; and wherein the at least one free radically co-polymerizable monomer is added at a rate in the range of ≥0.08 wt. %/minute to ≤1.66 wt. %/minute, based on the total weight of the at least one free radically co-polymerizable monomer of step (ii); and wherein the degree of change in the temperature from a target temperature during step (ii) is in the range of ≥−5.0% to ≤+5.0%.

In another preferred embodiment of the presently claimed invention, a process for preparing a polymer comprises at least the steps of:

i) preparing a polymerization mixture comprising a) at least one transition metal catalyst, b) at least one reducing agent, and c) at least one atom-transfer radical polymerization initiator; and ii) adding at least one free radically co-polymerizable monomer to the polymerization mixture to obtain the polymer; and wherein the at least one free radically co-polymerizable monomer is added at a rate in the range of ≥0.08 wt. %/minute to ≤1.66 wt. %/minute, based on the total weight of the at least one free radically co-polymerizable monomer of step (ii);

wherein the degree of change in the temperature from a target temperature during step (ii) is in the range of ≥−5.0% to ≤+5.0%; and wherein the step ii) is conducted within a time period in the range of ≥1 hour to ≤25 hours.

In another preferred embodiment of the presently claimed invention, a process for preparing a polymer comprises at least the steps of:

i) preparing a polymerization mixture comprising a) at least one transition metal catalyst, b) at least one reducing agent, and c) at least one atom-transfer radical polymerization initiator; and ii) adding at least one free radically co-polymerizable monomer to the polymerization mixture to obtain the polymer;

wherein the at least one free radically co-polymerizable monomer is added at a rate in the range of ≥0.08 wt. %/minute to ≤1.66 wt. %/minute, based on the total weight of the at least one free radically co-polymerizable monomer of step (ii); and wherein the at least one transition metal catalyst is added in an amount in the range of ≥0.1 ppm to ≤250 ppm.

In a yet another preferred embodiment of the presently claimed invention, a process for preparing a polymer comprises at least the steps of:
  i) preparing a polymerization mixture comprising
    a) at least one transition metal catalyst,
    b) at least one reducing agent, and
    c) at least one atom-transfer radical polymerization initiator; and
  ii) adding at least one free radically co-polymerizable monomer to the polymerization mixture to obtain the polymer; and
  wherein the at least one free radically co-polymerizable monomer is added at a rate in the range of ≥0.17 wt. %/minute to ≤0.83 wt. %/minute, based on the total weight of the at least one free radically co-polymerizable monomer of step (ii).

In a yet another preferred embodiment of the presently claimed invention, a process for preparing a polymer comprises at least the steps of:
  iii) preparing a polymerization mixture comprising
    d) at least one transition metal catalyst,
    e) at least one reducing agent, and
    f) at least one atom-transfer radical polymerization initiator; and
  iv) adding at least one free radically co-polymerizable monomer to the polymerization mixture to obtain the polymer; and
  wherein the at least one free radically co-polymerizable monomer is added at a rate in the range of ≥0.17 wt. %/minute to ≤0.83 wt. %/minute, based on the total weight of the at least one free radically co-polymerizable monomer of step (ii), and
  wherein the at least one free radically co-polymerizable monomer is an ethylenically unsaturated monomer and is selected from the group consisting of styrene, alpha-methyl styrene, methyl acrylate, ethyl acrylate, butyl acrylate, isobutyl acrylate, dodecyl acrylate, n-octyl acrylate, 2-chloroethyl acrylate, carboxyethyl acrylate, phenyl acrylate, benzyl acrylate, methyl alphachloroacrylate, methyl methacrylate, ethyl methacrylate, butyl methacrylate, isobutyl methacrylate, dodecyl methacrylate, n-octyl methacrylate, 2-chloroethyl methacrylate, carboxyethyl methacrylate, phenyl methacrylate, methyl alphachloromethacrylate, benzyl methacrylate, methacrylonitrile, acrylonitrile, N-vinyl pyrrolidone, N-vinylcarbazole, acrylic acid, methacrylic acid, acrylamide, methacrylamide, vinylpyridine, vinylpyrrolidone, vinyl-N-methylpyridinium chloride, vinyl naphthalene, vinyl fluoride, ethylene, 2-ethylbutyl acrylate, 2-ethylbutyl methacrylate, 2-ethylhexyl acrylate, 2-ethylhexyl methacrylate, 2-hydroxyethyl acrylate, 2-hydroxyethyl methacrylate, 2-hydroxypropyl acrylate, 2-hydroxypropyl methacrylate, 3-hydroxypropyl acrylate, 3-hydroxypropyl methacrylate, 3-hydroxybutyl acrylate, 3-hydroxybutyl methacrylate, 4-hydroxybutyl acrylate, 4-hydroxybutyl methacrylate, 6-hydroxyhexyl acrylate, 6-hydroxyhexyl methacrylate, 3-hydroxy-2-ethylhexyl acrylate, 3-hydroxy-2-ethylhexyl methacrylate, glycidyl acrylate, glycidyl methacrylate, and mixtures thereof.

In a yet another preferred embodiment of the presently claimed invention, a process for preparing a polymer comprises at least the steps of:
  v) preparing a polymerization mixture comprising
    g) at least one transition metal catalyst,
    h) at least one reducing agent, and
    i) at least one atom-transfer radical polymerization initiator; and
  vi) adding at least one free radically co-polymerizable monomer to the polymerization mixture to obtain the polymer; and
  wherein the at least one free radically co-polymerizable monomer is added at a rate in the range of ≥0.17 wt. %/minute to ≤0.83 wt. %/minute, based on the total weight of the at least one free radically co-polymerizable monomer of step (ii), and
  wherein the at least one free radically co-polymerizable monomer is an ethylenically unsaturated monomer and is selected from the group consisting of styrene, butyl acrylate, methyl methacrylate, butyl methacrylate, 2-ethylhexyl acrylate, 2-ethylhexyl methacrylate, 2-hydroxyethyl acrylate, 2-hydroxyethyl methacrylate, 2-hydroxypropyl acrylate, 2-hydroxypropyl methacrylate, 3-hydroxypropyl acrylate, 3-hydroxypropyl methacrylate, glycidyl methacrylate, and mixtures thereof.

In a yet another preferred embodiment of the presently claimed invention, a process for preparing a linear di-block polymer comprises at least the steps of:
  i) preparing a polymerization mixture comprising
    a) at least one transition metal catalyst,
    b) at least one reducing agent, and
    c) at least one atom-transfer radical polymerization initiator; and
  ii) adding at least one free radically co-polymerizable monomer selected from hydroxy ethyl acrylate and methyl acrylate to the polymerization mixture to obtain an acrylic polymer; and
  wherein the at least one free radically co-polymerizable monomer is added at a rate in the range of ≥0.08 wt. %/minute to ≤1.66 wt. %/minute, based on the total weight of the at least one free radically co-polymerizable monomer of step (ii).

In another preferred embodiment of the presently claimed invention, a process for preparing a polymer comprises at least the steps of:
  i) preparing a polymerization mixture, comprising
    a) at least one transition metal catalyst,
    b) at least one reducing agent, and
    c) at least one atom-transfer radical polymerization initiator; and
  ii) adding at least one free radically co-polymerizable monomer to the polymerization mixture to obtain the polymer; and
  wherein the at least one free radically co-polymerizable monomer is added at a rate in the range of ≥0.08 wt. %/minute to ≤1.66 wt. %/minute, based on the total weight of the at least one free radically co-polymerizable monomer of step (ii); and wherein the temperature in step (ii) is maintained in the range of ≥35° C. to ≤150° C.

In an embodiment of the presently claimed invention, a polymer is obtainable by a process described hereinabove. In a preferred embodiment of the presently claimed invention, the polymer is a block co-polymer, a linear polymer or a copolymer, a branched polymer or a copolymer, a brush polymer or a copolymer, a star polymer or a copolymer.

In another preferred embodiment of the presently claimed invention, the polydispersity of the polymer obtainable by the process described herein is in the range of ≥1.0 to ≤10.

In a more preferred embodiment of the presently claimed invention, the polydispersity of the polymer obtainable by the process described herein is in the range of ≥1.0 to ≤5.0.

In a most preferred embodiment of the presently claimed invention, the polydispersity of the polymer obtainable by the process described herein is in the range of ≥1.0 to ≤3.0. In a specifically most preferred embodiment of the presently claimed invention, the polydispersity of the polymer obtainable by the process described herein is in the range of ≥1.0 to ≤2.0, more preferably in the range of ≥ 1.10 to ≤1.60. In each case, the polydispersity is determined according to gel permeation chromatography against a polystyrene standard.

In a preferred embodiment of the presently claimed invention, the polymer obtainable by the process described herein has a number average molecular weight ($M_n$) in the range of from ≥ 100 g/mol to ≤1000,000 g/mol, determined according to gel permeation chromatography against a polystyrene standard. In another preferred embodiment of the presently claimed invention, the polymer obtainable by the process described herein has a number average molecular weight ($M_n$) in the range of from ≥200 g/mol to ≤100,000 g/mol g/mol, determined according to gel permeation chromatography against a polystyrene standard. In a more preferred embodiment of the presently claimed invention, the polymer obtainable by the process described herein has a number average molecular weight ($M_n$) in the range of from ≥200 g/mol to ≤50,000 g/mol, determined according to gel permeation chromatography against a polystyrene standard. In a most preferred embodiment of the presently claimed invention, the polymer obtainable by the process described herein has a number average molecular weight ($M_n$) in the range of from ≥500 g/mol to ≤50,000 g/mol, determined according to gel permeation chromatography against a polystyrene standard.

EMBODIMENTS

In the following, there is provided a list of embodiments to further illustrate the present disclosure without intending to limit the disclosure to the specific embodiments listed below.

1. A process for preparing a polymer comprising at least the steps of
   i) preparing a polymerization mixture, comprising
      a) at least one transition metal catalyst,
      b) at least one reducing agent, and
      c) at least one atom-transfer radical polymerization initiator; and
   ii) adding at least one free radically co-polymerizable monomer to the polymerization mixture to obtain the polymer; and
      wherein the at least one free radically co-polymerizable monomer is added at a rate in the range of ≥0.08 wt. %/minute to ≤1.66 wt. %/minute, based on the total weight of the at least one free radically co-polymerizable monomer of step (ii).

2. The process according to embodiment 1, wherein the a) at least one transition metal catalyst is a transition metal-halide catalyst.

3. The process according to embodiment 2, wherein the transition metal-halide catalyst is selected from the group consisting of iron chloride, iron bromide, iron iodide, iron (0), ruthenium chloride, ruthenium bromide, ruthenium iodide, copper chloride, copper bromide, copper iodide, and copper(0).

4. The process according to embodiment 1, wherein the b) at least one reducing agent is selected from the group consisting of tin 2-ethylhexanoate, sulfites, bisulfites, thiosulfites, mercaptans, hydroxylamines, amines, hydrazines, phenylhydrazines, hydrazones, hydroquinones, food preservatives, flavonoids, beta carotene, vitamin A, C-tocopherols, vitamin E, propyl gallate, octyl gallate, propionic acids, ascorbic acid, sorbates, reducing sugars, sugars comprising an aldehyde group, glucose, lactose, fructose, dextrose, potassium tartrate, nitrites, dextrin, aldehydes, glycine and antioxidants.

5. The process according to embodiment 1, wherein the b) at least one reducing agent is a free radical initiator.

6. The process according to embodiment 5, wherein the free radical initiator is selected from the group consisting of ammonium persulfate, hydrogen peroxide, acetyl peroxide, cumyl peroxide, tert-butyl peroxide, propionyl peroxide, benzoyl peroxide, chlorobenzoyl peroxide, dichlorobenzoyl peroxide, bromomethylbenzoyl peroxide, lauroyl peroxide, sodium persulfate, potassium persulfate, diisopropyl peroxycarbonate, tetralin hydroperoxide, 1-phenyl-2-methylpropyl-1-hydroperoxide, tert-butylhydroperoxide pertriphenylacetate, tert-butyl performate, tert-butyl peracetate, tert-butyl perbenzoate, tert-butyl perphenylacetate, tertbutyl permethoxyacetate, tert-butyl per-N-(3-toluyl)carbamate, 2,2'-azobispropane, 2,2'-dichloro-2,2'-azobispropane, 1,1'-azo(methylethyl)diacetate, 2,2'-azobis(2-amidinopropan) hydrochloride, 2,2'-azobis(2-amidinopropane)nitrate, 2,2'-azobisisobutane, 2,2'-azobisisobutylamide, 2,2'-azobisisobutyronitrile, methyl-2,2'-azobis-2-methylpropionate, 2,2'-dichloro-2,2'-azobisbutane, 2,2'-azobis-2-methylbutyronitrile, 2,2'-azobis-2-methylpropionitrile, ethyl-2-bromo-isobutyrate, dimethyl-2,2'-azobisisobutyrate, 1,1'-azobis(sodium 1-methylbutyronitrile-3-sulfonate), 2-(4-methylphenylazo)-2-methylmalonodinitrile, 4,4'-azobis-4-cyanovaleric acid, 3,5-dihydroxymethylphenylazo-2-methylmalonodinitrile, 2-(4-bromophenylazo)-2-allylmalonodinitrile, 2,2'-azobis-2-methylvaleronitrile, dimethyl 4,4'-azobis-4-cyanovalerate, 2,2'-azobis-2,4-dimethylvaleronitrile, 2,2'-azobis-4-methoxy-2,4-dimethylvaleronitrile, 1,1'-azobiscyclohexanenitrile, 2,2'-azobis-2-propylbutyronitrile, 1,1'-azobis-chlorophenylethane, 1,1'-azobis-1-cyclohexanecarbonitrile, 1,1'-azobis-1-cycloheptanenitrile, 1,1'-azobis-1-phenylethane, 1,1'-azobiscumene, ethyl 4-nitrophenylazobenzylcyanoacetate, phenylazodiphenylmethane, phenylazotriphenylmethane, 4-nitrophenylazotriphenylmethane, 1'-azobis-1,2-diphenylethane, poly(bisphenol-4,4'-azobis-4-cyanopentanoate), poly(tetraethylene glycol-2,2'-azobisisobutyrate), 1,4-bis(pentaethylene)-2-tetrazene, 1,4-dimethoxycarbonyl-1,4-dipheny-1-2-tetrazene and mixtures thereof.

7. The process according to embodiment 1, wherein the c) at least one atom-transfer radical polymerization initiator is selected from the group consisting of sulfonyl halides, alkyl halides and substituted alkyl halides.

8. The process according to embodiment 7, wherein the alkyl halides and substituted alkyl halides are selected from the group consisting of benzyl bromide, benzyl chloride, ethyl bromoacetate, diethyl-2-bromo-2-methylmalonate, ethyl-2-bromoisobutyrate, methyl-2-bromopropionate, ethyl-2-chloroisobutyrate and 1,2-bis(2-bromoisobutyryloxy)ethane.

9. The process according to embodiment 1, wherein the at least one free radically copolymerizable monomer is an ethylenically unsaturated monomer.

10. The process according to embodiment 9, wherein the ethylenically unsaturated monomer is selected from the group consisting of styrene, alpha-methyl styrene, methyl acrylate, ethyl acrylate, butyl acrylate, isobutyl acrylate, dodecyl acrylate, n-octyl acrylate, 2-chloroethyl acrylate, carboxyethyl acrylate, phenyl acrylate, benzyl acrylate, methyl alphachloroacrylate, methyl methacrylate, ethyl methacrylate, butyl methacrylate, isobutyl methacrylate, dodecyl methacrylate, n-octyl methacrylate, 2-chloroethyl methacrylate, carboxyethyl methacrylate, phenyl methacrylate, methyl alphachloromethacrylate, benzyl methacrylate, butadiene, isoprene, methacrylonitrile, acrylonitrile, vinyl methyl ether, vinyl isobutyl ether, vinyl ethyl ether, vinyl acetate, vinyl propionate, vinyl benzoate, vinyl butyrate, vinyl methyl ketone, vinyl hexyl ketone, methyl isopropenyl ketone, vinylidene chloride, vinylidene chlorofluoride, N-vinyl pyrrolidone, N-vinylcarbazole, acrylic acid, methacrylic acid, acrylamide, methacrylamide, vinyl pyridine, vinylpyrrolidone, vinyl-N-methylpyridinium chloride, vinyl naphthalene, p-chlorostyrene, vinyl chloride, vinyl bromide, vinyl fluoride, ethylene, propylene, butylene, isobutylene, 2-ethylbutyl acrylate, 2-ethylbutyl methacrylate, 2-ethylhexyl acrylate, 2-ethylhexyl methacrylate, 2-hydroxyethyl acrylate, 2-hydroxyethyl methacrylate, 2-hydroxypropyl acrylate, 2-hydroxypropyl methacrylate, 3-hydroxypropyl acrylate, 3-hydroxypropyl methacrylate, 3-hydroxybutyl acrylate, 3-hydroxybutyl methacrylate, 4-hydroxybutyl acrylate, 4-hydroxybutyl methacrylate, 6-hydroxyhexyl acrylate, 6-hydroxyhexyl methacrylate, 3-hydroxy-2-ethylhexyl acrylate, 3-hydroxy-2-ethylhexyl methacrylate, glycidyl acrylate, glycidyl methacrylate, and mixtures thereof.

11. The process according to embodiment 10, wherein the ethylenically unsaturated monomer is selected from the group consisting of styrene, alpha-methyl styrene, methyl acrylate, ethyl acrylate, butyl acrylate, isobutyl acrylate, dodecyl acrylate, n-octyl acrylate, 2-chloroethyl acrylate, carboxyethyl acrylate, phenyl acrylate, benzyl acrylate, methyl alphachloroacrylate, methyl methacrylate, ethyl methacrylate, butyl methacrylate, isobutyl methacrylate, dodecyl methacrylate, n-octyl methacrylate, 2-chloroethyl methacrylate, carboxyethyl methacrylate, phenyl methacrylate, methyl alphachloromethacrylate, benzyl methacrylate, methacrylonitrile, acrylonitrile, N-vinyl pyrrolidone, N-vinylcarbazole, acrylic acid, methacrylic acid, acrylamide, methacrylamide, vinylpyridine, vinylpyrrolidone, vinyl-N-methylpyridinium chloride, vinyl naphthalene, vinyl fluoride, ethylene, 2-ethylbutyl acrylate, 2-ethylbutyl methacrylate, 2-ethylhexyl acrylate, 2-ethylhexyl methacrylate, 2-hydroxyethyl acrylate, 2-hydroxyethyl methacrylate, 2-hydroxypropyl acrylate, 2-hydroxypropyl methacrylate, 3-hydroxypropyl acrylate, 3-hydroxypropyl methacrylate, 3-hydroxybutyl acrylate, 3-hydroxybutyl methacrylate, 4-hydroxybutyl acrylate, 4-hydroxybutyl methacrylate, 6-hydroxyhexyl acrylate, 6-hydroxyhexyl methacrylate, 3-hydroxy-2-ethylhexyl acrylate, 3-hydroxy-2-ethylhexyl methacrylate, glycidyl acrylate, glycidyl methacrylate, and mixtures thereof.

12. The process according to embodiment 10, wherein the ethylenically unsaturated monomer is selected from the group consisting of styrene, alpha-methyl styrene, methyl acrylate, ethyl acrylate, butyl acrylate, isobutyl acrylate, dodecyl acrylate, n-octyl acrylate, methyl methacrylate, ethyl methacrylate, butyl methacrylate, isobutyl methacrylate, dodecyl methacrylate, n-octyl methacrylate, phenyl methacrylate, methyl alphachloromethacrylate, benzyl methacrylate, methacrylonitrile, acrylonitrile, N-vinyl pyrrolidone, N-vinylcarbazole, acrylic acid, methacrylic acid, acrylamide, methacrylamide, vinylpyridine, vinylpyrrolidone, vinyl naphthalene, vinyl fluoride, ethylene, 2-ethylhexyl acrylate, 2-ethylhexyl methacrylate, 2-hydroxyethyl acrylate, 2-hydroxyethyl methacrylate, 2-hydroxypropyl acrylate, 2-hydroxypropyl methacrylate, 3-hydroxypropyl acrylate, 3-hydroxypropyl methacrylate, 3-hydroxybutyl acrylate, 3-hydroxybutyl methacrylate, 4-hydroxybutyl acrylate, 4-hydroxybutyl methacrylate, glycidyl acrylate, glycidyl methacrylate, and mixtures thereof.

13. The process according to embodiment 10, wherein the ethylenically unsaturated monomer is selected from the group consisting of styrene, butyl acrylate, methyl methacrylate, butyl methacrylate, 2-ethylhexyl acrylate, 2-ethylhexyl methacrylate, 2-hydroxyethyl acrylate, 2-hydroxyethyl methacrylate, 2-hydroxypropyl acrylate, 2-hydroxypropyl methacrylate, 3-hydroxypropyl acrylate, 3-hydroxypropyl methacrylate, glycidyl methacrylate, and mixtures thereof.

14. The process according to any of the embodiments 1 to 13, wherein the at least one free radically co-polymerizable monomer is added intermittently or continuously.

15. The process according to any of the embodiments 1 to 13, wherein the molar ratio of the at least one free radically co-polymerizable monomer to the at least one transition metal catalyst is in the range of ≥10:1.0 to ≤500,000:1.0.

16. The process according to any of the embodiments 1 to 15, wherein the molar ratio of the at least one free radically co-polymerizable monomer to the at least one atom-transfer radical polymerization initiator is in the range of ≥1.0:1.0 to ≤10,000:1.0.

17. The process according to any of the embodiments 1 to 16, wherein the molar ratio of the at least one transition metal catalyst to the at least one atom-transfer radical polymerization initiator is in the range of ≥0.0005:1.0 to ≤50:1.0.

18. The process according to any of the embodiments 1 to 17, wherein the molar ratio of the at least one free radical initiator to the at least one atom-transfer radical polymerization initiator is in the range of ≥0.005:1.0 to ≤50.0:1.0.

19. The process according to any of the embodiments 1 to 18, wherein the polymerization mixture further comprises at least one solvent.

20. The process according to embodiment 19, wherein the at least one solvent is selected from the group consisting of methanol, ethanol, n-propanol, isopropanol, butanol, butoxyethanol, acetone, butanone, pentanone, hexanone, methyl ethyl ketone, methyl isobutyl ketone, ethyl acetate, butyl acetate, amyl acetate, methoxy propyl acetate, tetrahydrofuran, diethyl ether, ethylene glycol, polyethylene glycol and mixtures thereof.

21. The process according to any of the embodiments 1 to 20, wherein step ii) is performed as a biphasic polymerization process, an emulsion polymerization process, a miniemulsion polymerization process, a microemulsion polymerization process, a reverse emulsion polymerization process or a suspension polymerization process.

22. The process according to any of the embodiments 1 to 21, wherein the at least one free radically co-polymerizable monomer is added at a rate in the range of ≥0.17 wt. %/minute to ≤0.83 wt. %/minute, based on the total weight of the at least one free radically copolymerizable monomer.

23. The process according to any of the embodiments 1 to 22, wherein the at least one free radically co-polymerizable monomer is added at a rate in the range of ≥0.25 wt. %/minute to ≤0.5 wt. %/minute, based on the total weight of the at least one free radically copolymerizable monomer 24. The process according to any of the embodiments 1 to 23, wherein the polymerization of the at least one free radically co-polymerizable monomer to a polymer allows conversion of at least 90% of the total free radically co-polymerizable monomer.

25. The process according to any of the embodiments 1 to 24, wherein in step ii) the temperature is maintained in the range of ≥35° C. to ≤150° C.

26. The process according to any of the embodiments 1 to 25, wherein in step ii) the degree of change in the temperature from a target temperature is in the range of 2-10.0% to ≤+10.0%.

27. The process according to any of the embodiments 1 to 26, wherein step ii) is conducted within a time period in the range of ≥1 hour to ≤25 hours.

While the presently claimed invention has been described in terms of its specific embodiments, certain modifications and equivalents will be apparent to those skilled in the art and are intended to be included within the scope of the presently claimed invention

EXAMPLES

The presently claimed invention is illustrated in detail by non-restrictive working examples which follow. More particularly, the test methods specified hereinafter are part of the general disclosure of the application and are not restricted to the specific working examples.

Preparation of the polymers/copolymers

According to methods that are familiar to those skilled in the art, the di-block copolymers (copolymer I, copolymer II and polymer IV) were synthesized by the super advanced controlled radical polymerization (CRP) or super advanced ATRP steps as described below. The raw material composition is provided in Tables 1, 3, and 7. The characteristics of the inventive copolymers synthesized are shown in Tables 2, 4, and 8.

Example 1

Preparation of diblock copolymer I

Figure 2:
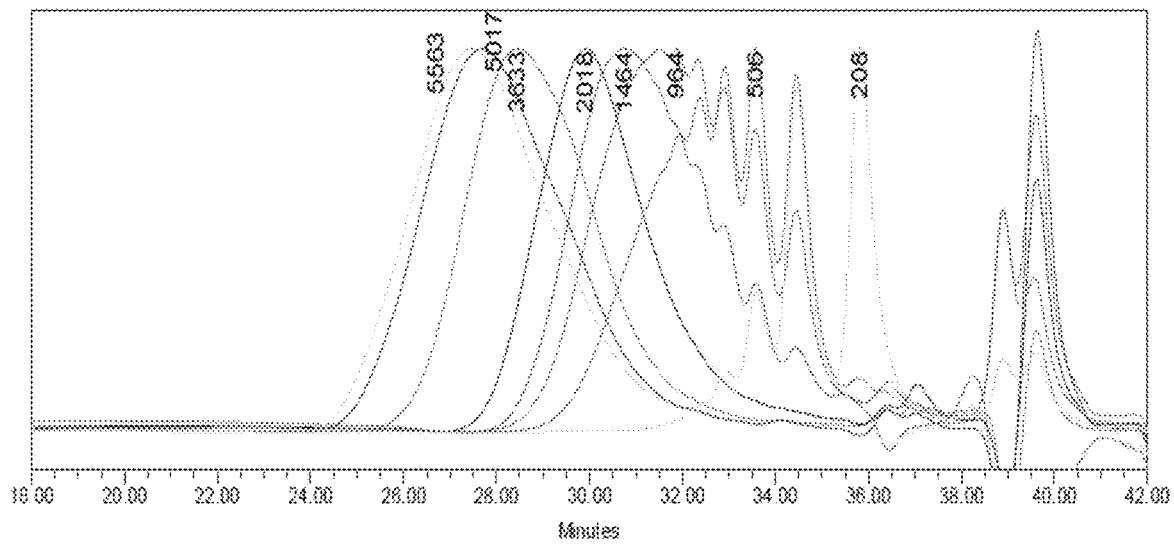
FIG. 2 presents the GPC chromatography results according to the Example 1 (copolymer I) experiment. The $M_p$ values of copolymer I from Table 2 are indicated in the Figure.

The diblock copolymer I was synthesized by super advanced ATRP in two steps. In the first step, the glycidyl methacrylate (GMA) was polymerized to poly glycidyl methacrylate (polyGMA) with active chain-end as the first block. This was followed by super advanced ATRP of a mixture of butyl acrylate (BMA), butyl acrylate (BA) and 2-hydroxypropyl methacrylate (HPMA) as described below. The raw material composition is provided in Table 1. The temperature profile was monitored via KEM-NET Controller as illustrated in FIG. 1. The monomer conversion was measured by NMR and Gas Chromatography as illustrated in FIG. 2.

Step A: A 3 L four neck round bottom flask fitted with a nitrogen line, a condenser, an agitator, a heating mantle and a thermocouple was charged with reagents 1-2 (Table 1). In a 20 mL sintered vial, reagents 3-5 (Table 1) were mixed and stirred to make a bluish green homogeneous solution of the catalyst, and the solution was added to the reaction flask. The solution was heated to 80° C. under nitrogen blanket. When the temperature reached 80° C., the mixture 6-7 (Table 1) was added to the flask at once. When temperature increased to 80° C. again, the monomer (GMA) 8 (Table 1) was fed to the reaction flask using a monomer pump. The feeding was done at 80° C. for a total of 2.5 hours, then the temperature was held at 80° C. for another 1 hour.

Step B: At the end of step A, the solvent (n-butyl acetate) 9 (Table 1) was added at once. Temperature dropped slightly. When the temperature reached 80° C. again, the mixture of 10 and 11 (Table 1) was added to the flask at once. The temperature dropped slightly, and it was allowed to reach to 80° C. At this point, the monomer mixture of 12-14 (Table 1) was fed at a constant rate through monomer pump. The feeding was completed in 3 hours and then the reaction was held at 80° C. for 1 hour. Subsequently the temperature was increased gradually to 90° C. and held for another 1 hour. The monomer conversion reached >99% and was analyzed via NMR.

TABLE 1

Synthesis of copolymer I

| | | Raw material | Weight (g) | Mol (Mols) | Molar ratio | Block molecular weight (g/mol) | Overall molecular weight (g/mol) |
|---|---|---|---|---|---|---|---|
| 1 | A | n-butyl acetate | 93.9300 | 0.8086 | 4.9138 | 1332.27 | 1332.27 |
| 2 | | TsCl | 31.3741 | 0.1646 | 1.000 | | |
| 3 | | TPMA | 0.3607 | 0.0012 | 0.0075 | | |
| 4 | | CuCl$_2$ | 0.1127 | 0.0008 | 0.0051 | | |
| 5 | | MeOH | 4.6967 | 0.1466 | 0.891 | | |
| 6 | | AMBN | 1.5100 | 0.0092 | 0.056 | | |
| 7 | | Butyl acetate | 20.0000 | 0.1722 | 1.046 | | |
| 8 | | Glycidyl methacrylate | 187.8686 | 1.3216 | 8.031 | | |
| 9 | B | n-butyl acetate | 200.0000 | 1.7218 | 6.992 | 3376.28 | 4708.54 |
| 10 | | AMBN | 5.5200 | 0.0287 | 0.117 | | |
| 11 | | Butyl acetate | 73.1700 | 0.6299 | 2.558 | | |
| 12 | | Butyl methacrylate | 200.4021 | 1.4093 | 5.723 | | |
| 13 | | HPMA | 278.9849 | 1.9350 | 7.857 | | |
| 14 | | n-butyl acrylate | 354.0316 | 2.7622 | 11.216 | | | where, n-butyl acetate was obtained from Nexeo Solutions LLC TsCl = p-toluene sulfonyl chloride was obtained from Sigma Aldrich TPMA = Tris(2-pyridylmethyl)amine was obtained from Sigma Aldrich CuCl$_2$ = copper chloride and MeOH = methanol were obtained from Sigma Aldrich AMBN = 2,2'-Azobis(2-methylbutyronitrile) was obtained from Akzo Nobel Coatings INC Glycidyl methacrylate was obtained from Dow Chemical n-butyl acrylate and butyl methacrylate was obtained from BASF Corporation HPMA = 2-hydroxypropyl methacrylate was obtained from Dow Chemical Monomer addition rate for synthesis of copolymer I: for step A=0.67 wt. %/min and for step B=0.55 wt. %/min.

The degree of change in the temperature from a target temperature during the monomer addition period during the process as also shown in FIG. 1, is in the range of ≥−2.1° C. to ≤+2.3° C. or in other words, ≥−2.6% to ≤+2.9%.

TABLE 2

Residual Monomers vs polymer molecular weight characteristics of copolymer I at different time intervals

| Step | Sample | Time (hours) | $M_n$ (g/mol) | $M_w$ (g/mol) | $M_p$ (g/mol) | PDI | Residual monomers/Total monomers (%) |
|---|---|---|---|---|---|---|---|
| A | 1 | 0.5 | 284 | 339 | 208 | 1.19 | 11 |
|   | 2 | 1.5 | 588 | 791 | 506 | 1.35 | 32 |
|   | 3 | 2.5 | 747 | 1048 | 964 | 1.40 | 29 |
|   | 4 | 3.5 | 1060 | 1370 | 1464 | 1.29 | 6 |
| B | 5 | 1 | 1597 | 1987 | 2018 | 1.24 | 17 |
|   | 6 | 2 | 2712 | 3599 | 3633 | 1.33 | 18 |
|   | 7 | 3 | 3648 | 5316 | 5017 | 1.46 | 17 |
|   | 8 | 4 | 4203 | 6100 | 5563 | 1.45 | <1 |

Example 2

Preparation of diblock copolymer II

Figure 3:
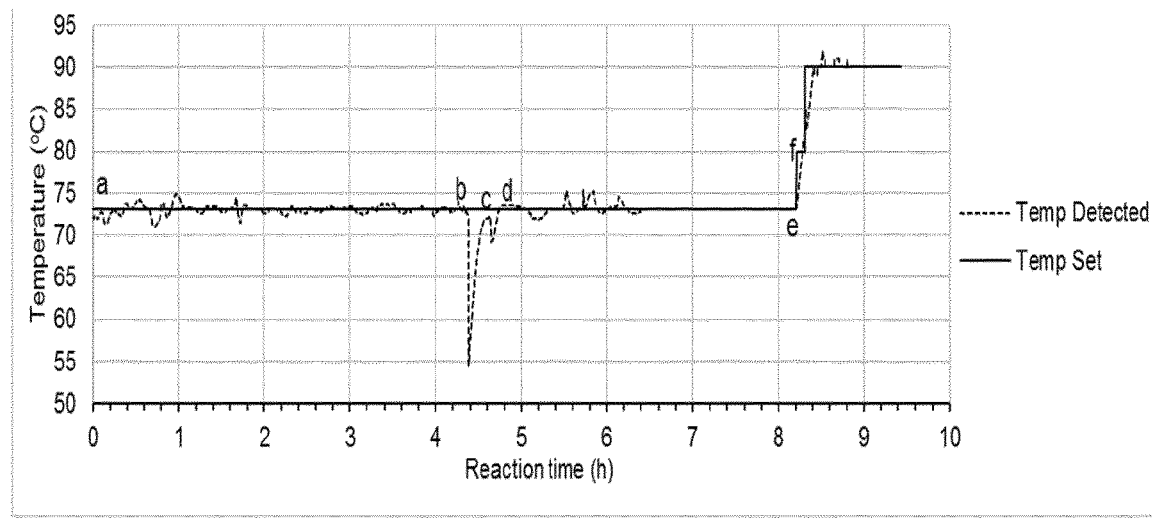
FIG. 3 presents a temperature profile that follows the reaction temperature during the polymerization reaction according to Example 2 (copolymer II). The temperature detected is the recorded temperature of the reaction mixture and the set temperature is the desired temperature of the reaction mixture. The starting point 'a' indicates the condition of initialization of feeding of the raw material 8 (Table 3) into a reaction flask containing materials 1-7 (Table 3) in the reaction flask at a set temperature 73° C.; 'b' indicates the addition of raw material 9 (Table 3) after step A is complete into the reaction flask; 'c' indicates addition of the reducing agent solution 10-11 (Table 3) into the reaction flask; 'd' indicates feeding of the monomer mixture 12-14 (Table 3) into the reaction flask; 'e' indicates the change of set temperature to 80° C.; 'f' indicates the change of set temperature to 90° C.
Figure 4:
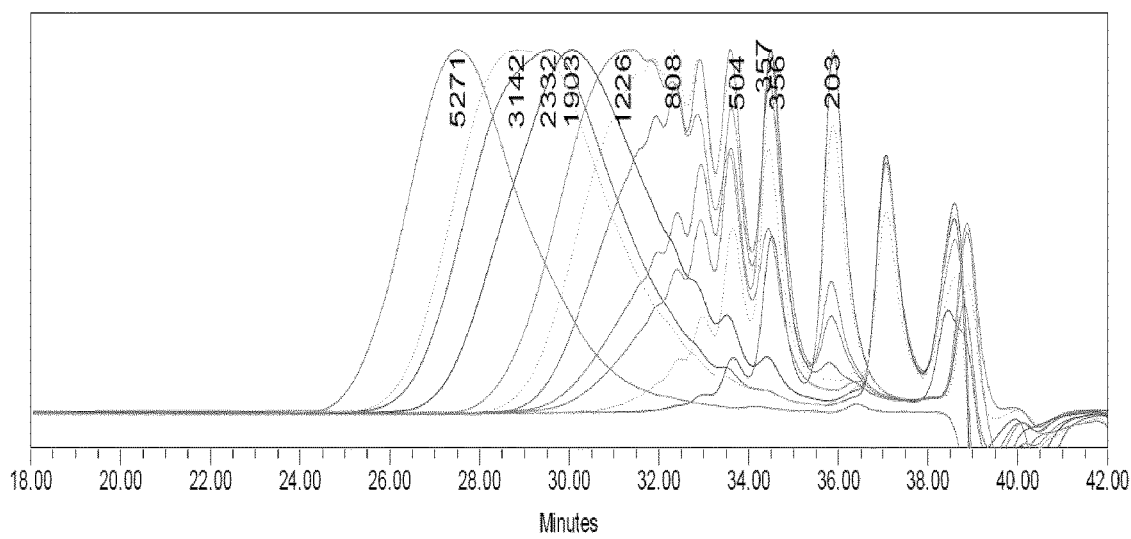
FIG. 4 presents the GPC chromatography results according to Example 2 (copolymer II) experiment. The $M_p$ values of copolymer II from Table 4 are indicated in the Figure.

The diblock copolymer II was synthesized by super advanced ATRP in two steps. In the first step, the glycidyl methacrylate (GMA) was polymerized to poly glycidyl methacrylate (polyGMA) with active chain-end as the first block. This was followed by super advanced ATRP of a mixture of butyl acrylate (BMA), butyl acrylate (BA) and 2-hydroxypropyl methacrylate (HPMA) as described below. The raw material composition is provided in Table 3. The temperature profile was monitored via KEM-NET Controller as illustrated in FIG. 3. The monomer conversion was measured by NMR and Gas Chromatography as illustrated in FIG. 4.

Step A: A 3 L four neck round bottom flask fitted with a nitrogen line, a condenser, an agitator, a heating mantle and a thermocouple was charged with reagents 1-2 (Table 3). In a 20 mL sintered vial, reagents 3-5 (Table 3) were mixed and stirred to make a bluish green homogeneous solution of the catalyst, and the solution was added to the reaction flask. The solution was heated to 73° C. under nitrogen blanket. When the temperature reached 73° C., the mixture 6-7 (Table 3) was added to the flask at once. When temperature increased to 73° C. again, the monomer (GMA) 8 (Table 3) was fed to the reaction flask using a monomer pump. The feeding was done at 73° C. for a total of 3.33 hours, then the temperature was held at 73° C. for another 1 hour.

Step B: At the end of step A, the solvent (n-butyl acetate) 9 (Table 3) was added at once. Temperature dropped slightly. When the temperature reached 73° C. again, the mixture of 10 and 11 (Table 3) was added to the flask at once. The temperature dropped slightly, and it was allowed to reach to 73° C. At this point, the monomer mixture of 12-14 (Table 3) was fed at a constant rate through monomer pump. The feeding was completed in 3.5 hours and then the reaction was held at 73° C. for 0.5 hour. Subsequently the temperature was increased gradually to 90° C. and held for another 1 hour. The monomer conversion reached >99% and was analyzed via NMR.

TABLE 3

Synthesis of copolymer II

| | | Raw material | Weight (g) | Mol (mols) | Molar ratio | Block molecular weight (g/mol) | Overall molecular weight (g/mol) |
|---|---|---|---|---|---|---|---|
| 1 | A | n-butyl acetate | 80.0000 | 0.6887 | 2.7966 | 976.40 | 976.40 |
| 2 |   | TsCl | 46.9500 | 0.2463 | 1.000 | | |
| 3 |   | TPMA | 0.5411 | 0.0019 | 0.0076 | | |
| 4 |   | $CuCl_2$ | 0.1691 | 0.0013 | 0.0051 | | |
| 5 |   | MeOH | 7.0451 | 0.2199 | 0.893 | | |
| 6 |   | AMBN | 1.5100 | 0.0079 | 0.032 | | |
| 7 |   | Butyl acetate | 20.0000 | 0.1722 | 0.699 | | |
| 8 |   | Glycidyl methacrylate | 193.5000 | 1.3612 | 5.527 | | |
| 9 | B | n-butyl acetate | 200.0000 | 1.7218 | 6.992 | 3384.27 | 4360.66 |
| 10 |   | AMBN | 5.5200 | 0.0287 | 0.117 | | |
| 11 |   | Butyl acetate | 73.1700 | 0.6299 | 2.558 | | |
| 12 |   | Butyl methacrylate | 200.4021 | 1.4093 | 5.723 | | |
| 13 |   | HPMA | 278.9849 | 1.9350 | 7.857 | | |
| 14 |   | n-butyl acrylate | 354.0316 | 2.7622 | 11.216 | | | where, n-butyl acetate was obtained from Nexeo Solutions LLC TsCl = p-toluene sulfonyl chloride was obtained from Sigma Aldrich TPMA = Tris(2-pyridylmethyl)amine was obtained from Sigma Aldrich $CuCl_2$ = copper chloride and MeOH = methanol were obtained from Sigma Aldrich AMBN = 2,2'-Azobis(2-methylbutyronitrile) was obtained from Akzo Nobel Coatings INC Glycidyl methacrylate was obtained from Dow Chemical n-butyl acrylate and butyl methacrylate was obtained from BASF Corporation HPMA = 2-hydroxypropyl methacrylate was obtained from Dow Chemical Monomer addition rate for synthesis of copolymer II: for step A=0.50 wt. %/min and for step B=0.48 wt. %/min.

The degree of change in the temperature from a target temperature during the monomer addition period during the process as also shown in FIG. 3, is in the range of ≥−2.2° C. to ≤+2.3° C. or in other words, ≥−3.0% to ≤+3.2%.

TABLE 4

Residual Monomers vs polymer molecular weight characteristics of copolymer II at different time intervals

| Step | Sample | Time (hours) | $M_n$ (g/mol) | $M_w$ (g/mol) | $M_p$ (g/mol) | PDI | Residual monomers/Total monomers (%) |
|---|---|---|---|---|---|---|---|
| A | 1 | 1 | 243 | 278 | 203 | 1.15 | 16 |
|   | 2 | 2 | 313 | 389 | 353 | 1.24 | 33 |
|   | 3 | 3 | 430 | 568 | 357 | 1.32 | 32 |
|   | 4 | 3.33 | 479 | 645 | 356 | 1.35 | 29 |
|   | 5 | 4.33 | 608 | 816 | 504 | 1.34 | 15 |
| B | 6 | 0.5 | 744 | 982 | 808 | 1.32 | 25 |
|   | 7 | 1 | 864 | 1191 | 1226 | 1.38 | 29 |
|   | 8 | 2 | 1341 | 1947 | 1903 | 1.45 | 32 |
|   | 9 | 3 | 1816 | 2693 | 2332 | 1.48 | 33 |
|   | 10 | 3.33 | 2224 | 3077 | 3142 | 1.38 | 34 |
|   | 11 | 4.33 | 4034 | 5378 | 5271 | 1.33 | <1 |

Comparative Example 1

Preparation of diblock copolymer III

Figure 5:
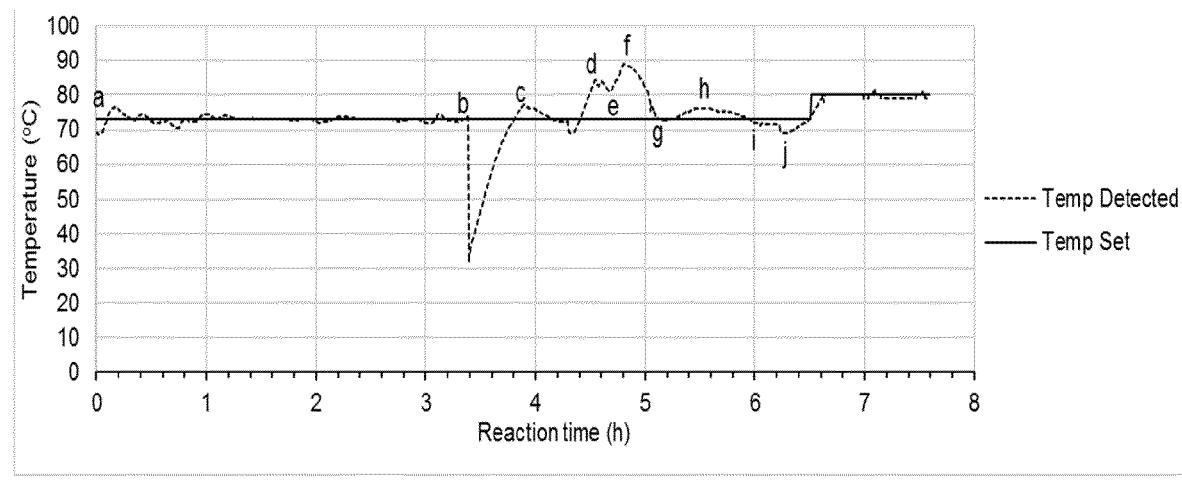
FIG. 5 presents a temperature profile that follows the reaction temperature during the polymerization reaction according to Comparative Example 1(copolymer III). The temperature detected is the recorded temperature of the reaction mixture and the set temperature is the desired temperature of the reaction mixture. The starting point 'a' indicates the condition of initialization of feeding the raw materials 7-8 (Table 5) in the reaction flask containing materials 1-6 (Table 5); 'b' indicates the addition of raw material 9-12 (Table 5) in step B; 'c' indicates addition of the reducing agent solution 13-14 (Table 5) into the reaction flask; 'd' indicates the stopped heating and application of cooling air to control the exotherm; 'e' indicates the stopped cooling air condition; 'f' indicates the restart of cooling air; 'g' indicates the stopped cooling air condition; 'h' indicates restart of cooling air; 'I' indicates the stopped cooling air condition; 'j' indicates restart of heating at set temperature of 80° C.
Figure 6:
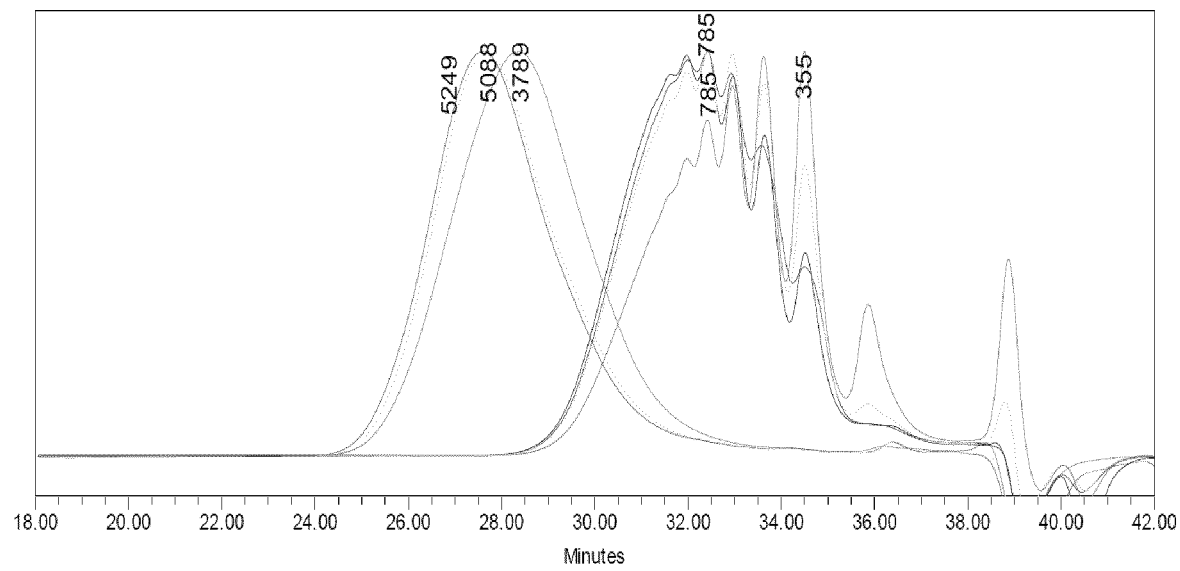
FIG. 6 presents the GPC chromatography results according to Comparative Example 1 (copolymer III) experiment. The $M_p$ values of copolymer III from Table 6 are indicated in the Figure.

The diblock copolymer III was synthesized by traditional ATRP in two steps. In the first step, the glycidyl methacrylate (GMA) was polymerized to poly glycidyl methacrylate (polyGMA) with active chain-end as the first block. This was followed by traditional ATRP of a mixture of butyl acrylate (BMA), butyl acrylate (BA) and 2-hydroxypropyl methacrylate (HPMA) as described below. The raw material composition is provided in Table 5. The temperature profile was monitored via KEM-NET Controller as illustrated in FIG. 5. The monomer conversion was measured by NMR and Gas Chromatography as illustrated in FIG. 6.

Step A: A 3 L four neck round bottom flask fitted with a nitrogen line, a condenser, an agitator, a heating mantle and a thermocouple was charged with reagents 1-3 (Table 5). In a 20 mL sintered vial, reagents 3-5 (Table 5) were mixed and stirred to make a bluish green homogeneous solution of the catalyst, and the solution was added to the reaction flask. The solution was heated to 73° C. under nitrogen blanket. When the temperature reached 73° C., the mixture 6-7-8 (Table 5) was added to the flask at once. The mixture was held at 73° C. for a total of 3.33 hours.

Step B: At the end of step A, the mixture 9-12 (Table 5) was added at once. When the temperature reached 73° C. again, the mixture of 13-14 (Table 5) was added to the flask at once. The temperature dropped slightly immediately, and it was allowed to reach to 73° C. by external heat supply through heating mantle. Within a few minutes, a self-accelerated exotherm started which increased the temperature to 85° C. without 10 minutes. With no-heat supply and applying cooling air, the temperature dropped slightly. However, when cooling air stopped, the temperature increased again. The exotherm was uncontrolled without applying cooling air. Therefore, cooling air was continued to maintain the temperature 73° C.-90° C. In total 2 hours after addition of the reducing agent, 13-14 (Table 5), the temperature dropped below 73° C. The monomer conversion reached ~95% was analyzed by NMR. The reaction was continued at 80° C. for another 1.5 hours.

TABLE 5

Synthesis of copolymer III

|   |   | Raw material | Weight (g) | Mol (mols) | Molar ratio | Block molecular weight (g/mol) | Overall molecular weight (g/mol) |
|---|---|---|---|---|---|---|---|
| 1 | A | n-butyl acetate | 80.0000 | 0.6887 | 9.7882 | 976.40 | 976.40 |
| 2 |   | Glycidyl methacrylate | 193.5000 | 1.3612 | 5.527 |   |   |
| 3 |   | TsCl | 46.9500 | 0.2463 | 1.000 |   |   |
| 4 |   | TPMA | 0.5411 | 0.0019 | 0.0076 |   |   |
| 5 |   | $CuCl_2$ | 0.1691 | 0.0013 | 0.0051 |   |   |
| 6 |   | MeOH | 7.0451 |   |   |   |   |
| 7 |   | AMBN | 1.5100 | 0.0079 | 0.032 |   |   |
| 8 |   | Butyl acetate | 20.0000 | 0.1722 | 0.699 |   |   |
| 9 | B | Butyl methacrylate | 200.4021 | 1.4093 | 5.723 | 3384.27 | 4360.66 |
| 10 |   | HPMA | 278.9849 | 1.9350 | 7.857 |   |   |
| 11 |   | N-butyl acetate | 200.0000 | 1.7218 | 6.992 |   |   |

TABLE 5-continued

Synthesis of copolymer III

|  | Raw material | Weight (g) | Mol (mols) | Molar ratio | Block molecular weight (g/mol) | Overall molecular weight (g/mol) |
| --- | --- | --- | --- | --- | --- | --- |
| 12 | butyl acrylate | 354.0316 | 2.7622 | 11.216 | | |
| 13 | AMBN | 5.5200 | 0.0919 | 0.068 | | |
| 14 | Butyl acetate | 73.1700 | 0.3806 | 1.545 | | | where, n-butyl acetate was obtained from Nexeo Solutions LLC TsCl = p-toluene sulfonyl chloride was obtained from Sigma Aldrich TPMA = Tris(2-pyridylmethyl)amine was obtained from Sigma Aldrich CuCl$_2$ = copper chloride and MeOH = methanol were obtained from Sigma Aldrich AMBN = 2,2'-Azobis(2-methylbutyronitrile) was obtained from Akzo Nobel Coatings INC Glycidyl methacrylate was obtained from Dow Chemical n-butyl acrylate and butyl methacrylate was obtained from BASF Corporation HPMA = 2-hydroxypropyl methacrylate was obtained from Dow Chemical Monomer addition rate for synthesis of copolymer III: for step A=100 wt. %/min and for step B=100 wt. %/min.

The degree of change in the temperature from a target temperature during the monomer conversion period in the process as shown in FIG. 5 is in the range of 2-2.3° C. to ≤+16° C. or in other words, ≥−3.2% to ≤+22.0%. The cooling air was applied to prevent further increase in solution temperature from the set temperature during exotherm.

TABLE 6

Residual Monomers vs polymer molecular weight characteristics of copolymer III at different time intervals

| Step | Sample | Time (hours) | $M_n$ (g/mol) | $M_w$ (g/mol) | $M_p$ (g/mol) | PDI | Residual monomers/Total monomers (%) |
| --- | --- | --- | --- | --- | --- | --- | --- |
| A | 1 | 1 | 532 | 759 | 355 | 1.43 | 15 |
|  | 2 | 2 | 646 | 883 | 785 | 1.37 | 2 |
|  | 3 | 3 | 682 | 913 | 785 | 1.34 | 1 |
|  | 4 | 3.33 | 706 | 947 | 784 | 1.34 | <1 |
| B | 5 | 1 | 3013 | 4356 | 3789 | 1.45 | 16 |
|  | 6 | 2 | 3716 | 5193 | 5088 | 1.40 | 5 |
|  | 7 | 3 | 3929 | 5471 | 5249 | 1.39 | 2 |

Example 3

Preparation of polymer IV

Figure 7:
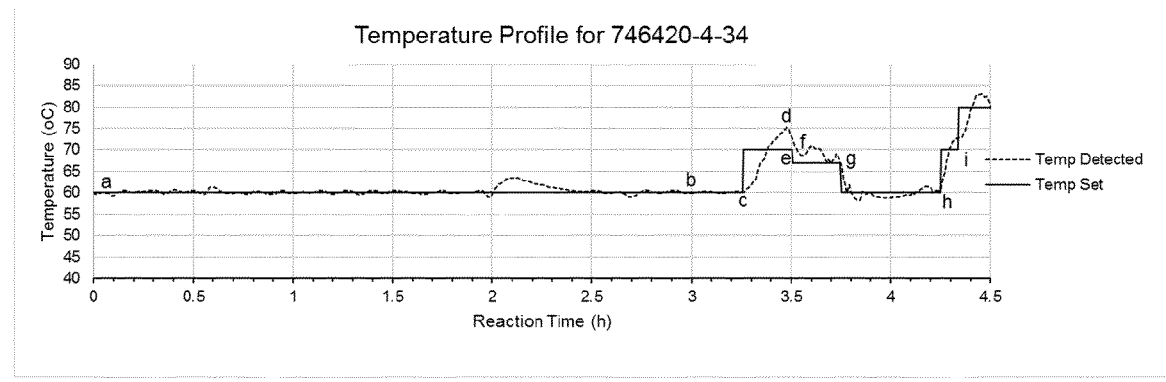
FIG. 7 presents a temperature profile that follows the reaction temperature during the polymerization reaction according to Example 3 (polymer IV). The temperature detected is the recorded temperature of the reaction mixture and the set temperature is the desired temperature of the reaction mixture. The starting point 'a' indicates the condition of initialization of feeding the raw material 8 (Table 7) in the reaction flask containing materials 1-7 (Table 7) at a set temperature of 60° C.; 'b' indicates the complete addition of raw material 8 (Table 5); 'c' indicates the change of set temperature to 70° C.; 'd' indicates temperature increase due to self-exotherm which subsides upon application of cooling air; 'e' change of the set temperature to 67° C.; 'f' indicates the stopped cooling air condition; 'g' indicates change of the set temperature to 60° C.; 'h' indicates change of the set temperature to 70° C.; 'i' indicates change of the set temperature to 80° C.
Figure 8:
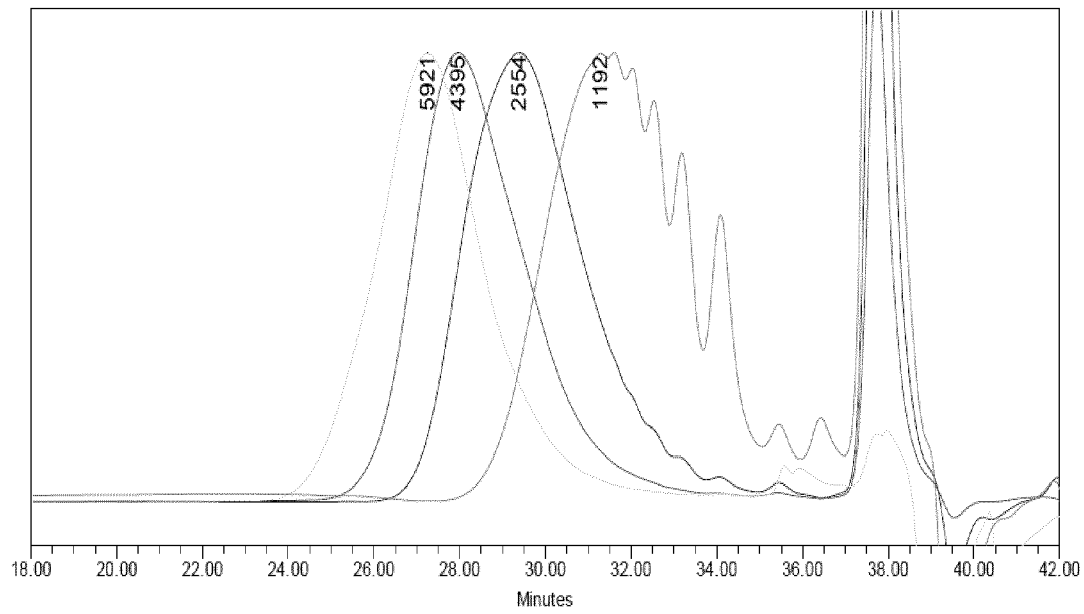
FIG. 8 presents the GPC chromatography results according to Example 3 (polymer IV) experiment. The $M_p$ values of polymer IV from Table 8 are indicated in the Figure.

Polymerization of 2-hydroxyethyl acrylate (HEA) was carried out using the super advanced ATRP method. The raw material composition is provided in Table 7. The temperature profile was monitored via KEM-NET Controller as illustrated in FIG. 7. The monomer conversion was measured by NMR and Gas Chromatography as illustrated in FIG. 8.

Procedure: In a 1 L four neck round bottom flask fitted with a nitrogen line. a condenser, an agitator, a heating mantle and a thermocouple were charged with reagents 1-2 (Table 7). In a 20 mL sintered vial, reagents 3-5 (Table 7) were mixed and stirred to make a bluish green homogeneous solution of the catalyst and the solution was added to the reaction flask. The solution was heated to 60° C. under nitrogen blanket. When temperature reached 60° C., the mixture 6-7 (Table 7) was added to the flask at once. When temperature increased to 60° C. again, the monomer 8 (HEA) (Table 7) was fed to the reaction flask using a monomer pump. The feeding was done at 60° C. in total 3 hours, then the temperature was held at 60° C. for another 1 hour.

TABLE 7

Synthesis of polymer IV

| S. No. | Raw material | Weight (g) | Mol (Mols) | Molar ratio | Theoretical molecular weight (g/mol) |
|---|---|---|---|---|---|
| 1 | Propylene glycol n-propyl ether | 40.0000 | 0.3385 | 11.1517 | 4588.07 |
| 2 | EBiB | 5.9200 | 0.0304 | 1.000 | |
| 3 | TPMA | 0.0680 | 0.0002 | 0.0077 | |
| 4 | CuCl2 | 0.2120 | 0.0016 | 0.0520 | |
| 5 | MeOH | 0.7000 | 0.0218 | 0.720 | |
| 6 | 2,2'-azobis(2,4-dimethylpentanenitrile) (VAZO-52) | 0.5280 | 0.0032 | 0.106 | |
| 7 | MEK | 4.0000 | 0.0009 | 0.029 | |
| 8 | HEA | 133.3333 | 1.1482 | 37.832 | | where,
Propylene Glycol n-Propyl Ether was obtained from Nexeo Solutions LLC
EBiB = ethyl 2-bromoisobutyrate was obtained from Sigma Aldrich
TPMA = Tris(2-pyridylmethyl)amine was obtained from Sigma Aldrich
CuCl2 = copper chloride and MeOH = methanol were obtained from Sigma Aldrich
VAZO-52 = was obtained from the Chemours company
MEK = methyl ethyl ketone was obtained from Nexeo Solutions LLC
HEA = 2-hydroxyethyl acrylate was obtained from Rohm and Haas Chemicals LLC Monomer addition rate for synthesis of polymer IV: 0.55 wt. %/min.

The degree of change in the temperature from a target temperature during the monomer addition period as shown in FIG. 7 is in the range of $\geq -1°$ C. to $\leq +3.5°$ C. or in other words, $\geq -1.67\%$ to $\leq +5.8\%$.

TABLE 8

Residual Monomers vs polymer molecular weight characteristics of polymer IV at different time intervals

| Sample | Time (hours) | $M_n$ (g/mol) | $M_w$ (g/mol) | $M_p$ (g/mol) | PDI | Residual monomers/Total monomers (%) |
|---|---|---|---|---|---|---|
| 1 | 1 | 911 | 1173 | 1192 | 1.29 | 16 |
| 2 | 1.88 | 2085 | 2615 | 2554 | 1.25 | 29 |
| 3 | 3 | 3300 | 4235 | 4395 | 1.28 | 27 |
| 4 | 4.5 (acetylated) | 4988 | 6701 | 5921 | 1.34 | <1 |

Comparative Example 2

Preparation of polymer V

Figure 9:
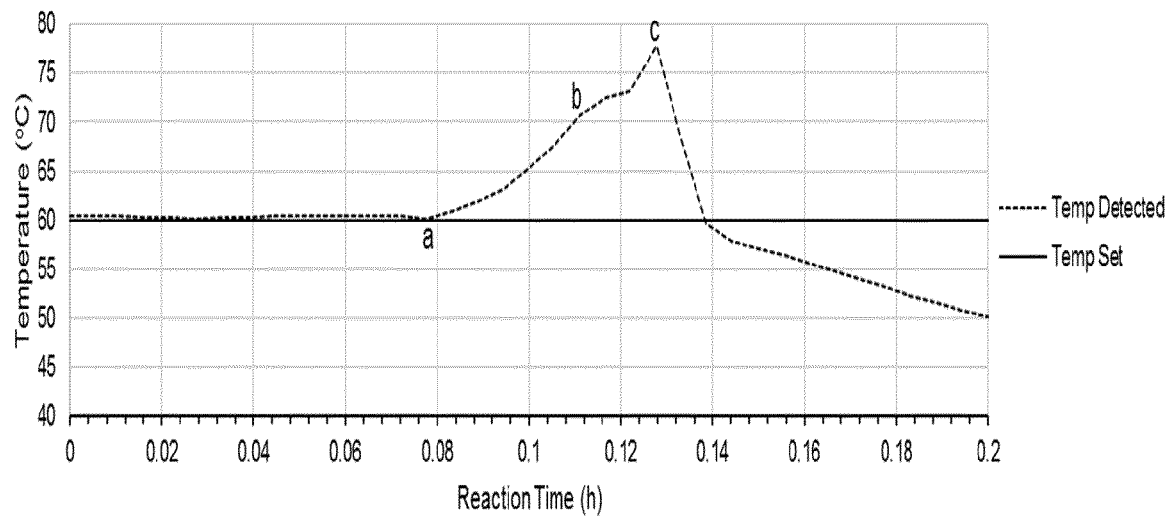
FIG. 9 presents a temperature profile that follows the reaction temperature during the polymerization reaction according to Comparative Example 2 (polymer V). The temperature detected is the temperature of the reaction mixture and the set temperature is the desired temperature of the reaction mixture. The starting point 'a' indicates the condition of initialization of feeding the reducing agent 7-8 (Table 9) in the reaction flask containing materials 1-6 (table 7) at a set temperature of 60° C.; 'b' indicates stopped heating and application of cooling air condition; 'c' indicates the addition of benzothiazine inhibitor (3 wt. % with respect to the total HEA monomer amount).

Polymerization of 2-hydroxyethyl acrylate (HEA) was carried out using the traditional ATRP method. The raw material composition is provided in Table 9. The temperature profile was monitored via KEM-NET Controller as illustrated in FIG. 9.

Procedure: In a 1 L four neck round bottom flask fitted with a nitrogen line, a condenser, an agitator, a heating mantle and a thermocouple were charged with reagents 1-3 (Table 9). In a 20 mL sintered vial, reagents 4-6 (Table 9) were mixed and stirred to make a bluish green homogeneous solution of the catalyst and the solution was added to the reaction flask. The solution was heated to 60° C. under nitrogen blanket. When temperature reached 60° C., the mixture 7-8 (Table 9) was added to the flask at once. Due to immediate appearance of an of excessive exothermic reaction, the polymerization was quenched with benzothiazine inhibitor and cooling air.

TABLE 9

Synthesis of polymer V

| S. No. | Raw material | Weight (g) | Mol (Mols) | Molar ratio | Theoretical molecular weight (g/mol) |
|---|---|---|---|---|---|
| 1 | Propylene glycol n-propyl ether | 40.0000 | 0.3385 | 11.1517 | 4588.07 |
| 2 | EBiB | 5.9200 | 0.0304 | 1.000 | |
| 3 | HEA | 133.3333 | 1.1482 | 37.832 | |
| 4 | TPMA | 0.0680 | 0.0002 | 0.0077 | |
| 5 | CuCl$_2$ | 0.2120 | 0.0016 | 0.0520 | |
| 6 | MeOH | 0.7000 | 0.0218 | 0.720 | |
| 7 | 2,2'-azobis(2,4-dimethylpentanenitrile) (VAZO-52) | 0.5280 | 0.0032 | 0.106 | |
| 8 | MEK | 4.0000 | 0.0009 | 0.029 | | where,
Propylene glycol n-propyl Ether = was obtained from Nexeo Solutions LLC
EBiB = ethyl 2-bromoisobutyrate was obtained from Sigma Aldrich
TPMA = Tris(2-pyridylmethyl)amine was obtained from Sigma Aldrich
CuCl$_2$ = copper chloride and MeOH = methanol were obtained from Sigma Aldrich
VAZO-52 = was obtained from the Chemours company
MEK = methyl ethyl ketone was obtained from Nexeo Solutions LLC
HEA = 2-hydroxyethyl acrylate was obtained from Rohm and Haas Chemicals LLC Monomer addition rate for synthesis of polymer V: 100 wt. %/min.

The degree of change in the temperature from a target temperature during the monomer conversion period in the process as shown in FIG. 9 is in the range of $\geq -43.2°$ C. to $\leq +17.8°$ C. or $\geq -72.1\%$ to $\leq +30.0\%$.

Example 4

Preparation of Diblock Copolymer VI (Inventive Example)

Figure 10:
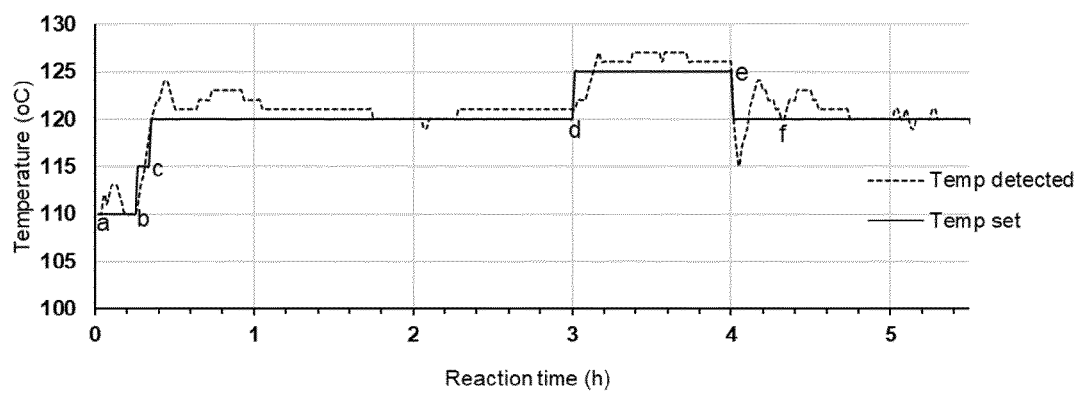
FIG. 10 presents a temperature profile that follows the reaction temperature during the polymerization reaction according to Example 4 (copolymer VII). The temperature detected is the recorded temperature of the reaction mixture and the set temperature is the desired temperature of the reaction mixture. The starting point 'a' indicates the condition of initialization of feeding of monomer 9 (Table 10) into a reaction flask containing 1-8 (Table 10) in the reaction flask at a set temperature 110° C.; 'b' and 'c' indicates the increase in set temperature to 115° C. and 120° C., respectively. The end of monomer feed for step A and increase of set temperature to 125° C. is indicated by "d". After 1 h of holding at 125° C., temperature was set to 120° C. and added the mixture "10-11", indicated by "e". When temperature reached 120° C., monomer mixture "12-13" was fed at a constant rate, indicated by "f".
Figure 11:
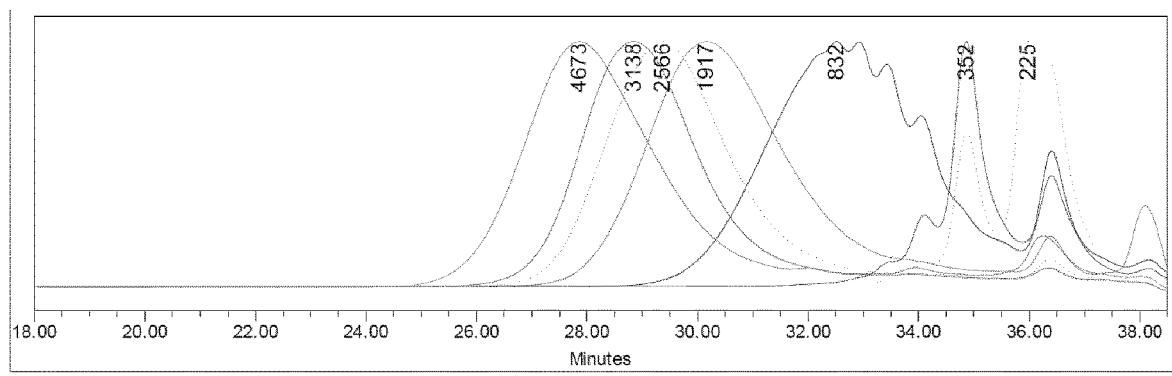
FIG. 11 presents the GPC chromatography results according to the Example 4 (copolymer VI) experiment. The $M_p$ values of copolymer VI from Table 11 are indicated in the Figure.

The diblock copolymer IV was synthesized by super advanced ATRP in two steps. In the first step, the styrene was polymerized to polystyrene (pSt) with active chain-end as the first block. This was followed by super advanced ATRP of a mixture of butyl acrylate (BA) and N-vinyl carbazole (NVCz) to produce pSt-block-p (BA-co-NVCz) as described below. The raw material composition is provided in Table 10. The temperature profile was monitored via Honeywell Temperature Controller as illustrated in FIG. 10. The monomer conversion was measured by Gas Chromatography as illustrated in Table 11.

Step A: A 1 L four neck round bottom flask fitted with a nitrogen line, a condenser, an agitator, a heating mantle and a thermocouple were charged with reagents 1-2 (Table 10). In a 20 mL sintered vial, reagents 3-5 (Table 10) were mixed and stirred to make a bluish green homogeneous solution of the catalyst, and the solution was added to the reaction flask.

The solution was heated to 110° C. under nitrogen blanket. When the temperature reached 110° C., the mixture 6-8 (Table 10) was added to the flask at once. When temperature reached to 110° C. again, the monomer (styrene) 8 (Table 10) was fed to the reaction flask using a monomer pump. The feeding was done at 110-120° C. for a total of 3 hours, then the temperature was held at 125° C. for another 1 hour.

Step B: At the end of step A, temp was set to 120° C., and the mixture of 10-11 (Table 10) was added at once. Temperature dropped slightly. When the temperature reached 120° C. again, the mixture of 12 and 13 (Table 10) was fed at a constant rate through monomer pump in total 1 hour. The monomer conversion reached 79% and was analyzed via Gas Chromatography as illustrated in Table 11

TABLE 10

Synthesis of copolymer VI

| | | Raw materials | Weight (g) | Mol (Mols) | Molar ratio | Block molecular weight (g/mol) | Overall molecular weight (g/mol) |
|---|---|---|---|---|---|---|---|
| 1 | A | MIAK | 60.00 | 0.53 | 5.73 | 3912.72 | 3912.72 |
| 2 | | TsCl | 24.00 | 0.09 | 1.00 | | |
| 3 | | TPMA | 0.28 | 0.00 | 0.01 | | |
| 4 | | CuCl$_2$ | 0.10 | 0.00 | 0.01 | | |
| 5 | | MeOH | 3.83 | 0.12 | 1.26 | | |
| 6 | | MIAK | 20.00 | 0.18 | 2.96 | | |
| 7 | | Dicumyl peroxide | 16.00 | 0.06 | 0.62 | | |
| 8 | | ACHN | 8.00 | 0.03 | 0.35 | | |
| 9 | | styrene | 480.00 | 3.33 | 35.14 | | |
| 10 | B | MIAK | 20.00 | 0.18 | 1.85 | 1686.67 | 5599.38 |
| 11 | | Dicumyl peroxide | 4.80 | 0.02 | 0.19 | | |
| 12 | | butyl acrylate | 80.00 | 0.62 | 6.58 | | |
| 13 | | N-vinyl carbazole | 80.00 | 0.41 | 4.36 | | | where, MIAK = methyl isoamyl ketone was obtained from Eastman TsCl = p-toluene sulfonyl chloride was obtained from Sigma Aldrich TPMA = Tris(2-pyridylmethyl)amine was obtained from Sigma Aldrich CuCl$_2$ = copper chloride and MeOH = methanol were obtained from Sigma Aldrich ACHN = 1,1'-Azobis (cyanocyclohexane) was obtained from Akzo Nobel Coatings INC Dicumyl peroxide was obtained from Sigma Aldrich Styrene was obtained from Sigma Aldrich n-butyl acrylate and butyl methacrylate was obtained from BASF Corporation N-Vinyl Carbazole was obtained from Sigma Aldrich Monomer addition rate for synthesis of copolymer I: for step A=0.55 wt. %/min and for step B=1.66 wt. %/min.

The degree of change in the temperature from a target temperature during the monomer addition period during the process as also shown in FIG. 10, is in the range of 2-1° C. to ≤+4° C. or in other words, ≥−0.83% to ≤+3.3%.

TABLE 11

Residual Monomers vs polymer molecular weight characteristics of copolymer I at different time intervals

| Step | Sample | Time (hours) | $M_n$ (g/mol) | $M_w$ (g/mol) | $M_p$ (g/mol) | PDI | Residual monomers/Total monomers (%) |
|---|---|---|---|---|---|---|---|
| A | 1 | 0.25 | 247 | 268 | 225 | 1.09 | 7 |
| | 2 | 0.5 | 309 | 345 | 352 | 1.12 | 4 |
| | 3 | 1.25 | 598 | 810 | 832 | 1.23 | 23 |
| | 4 | 2.25 | 1543 | 1894 | 1917 | 1.23 | 35 |
| | 5 | 3.0 | 2077 | 2577 | 2566 | 1.24 | 39 |
| | 6 | 4.0 | 2494 | 3114 | 3138 | 1.25 | 9 |
| B | 7 | 2 | 3770 | 4723 | 4673 | 1.25 | 21 |

Comparative Example 3

Preparation of polymer VII

Figure 12:
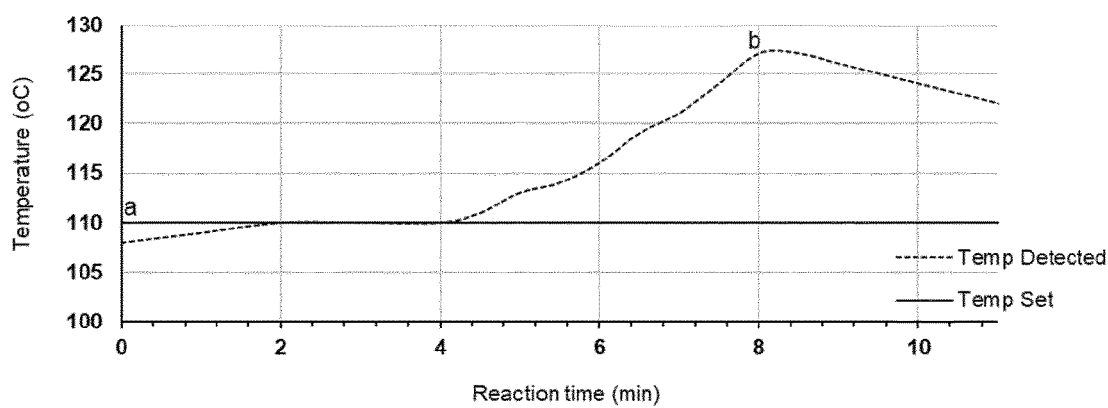
FIG. 12 presents a temperature profile that follows the reaction temperature during the polymerization reaction according to Comparative Example 3 (polymer VI). The temperature detected is the recorded temperature of the reaction mixture and the set temperature is the desired temperature of the reaction mixture. The starting point 'a' indicates the condition of initialization of feeding of initiator mixture "7-8" (Table 12) into a reaction flask containing "1-6" and "9" (Table 12) in the reaction flask at a set temperature 110° C.; 'b' indicates quenching the reaction by inhibitor and cooling air.

Polymerization of styrene was carried out using the traditional ATRP method. The raw material composition is provided in Table 12. The temperature profile was monitored via Honeywell Temperature Controller as illustrated in FIG. 12.

Procedure: A 1 L four neck round bottom flask fitted with a nitrogen line, a condenser, an agitator, a heating mantle and a thermocouple was charged with reagents 1-2 (Table 10). In a 20 mL sintered vial, reagents 3-5 (Table 10) were mixed and stirred to make a bluish green homogeneous solution of the catalyst, and the solution was added to the reaction flask followed by 9 (monomer). The solution was heated to 110° C. under nitrogen blanket. When the temperature reached 110° C., the mixture 6-8 (Table 12) was added to the flask at once. Due to immediate appearance of an of excessive exothermic reaction, the polymerization was quenched with benzothiazine inhibitor and cooling air.

TABLE 12

Synthesis of polymer VII

| | Raw materials | Weight (g) | Mol (Mols) | Molar ratio | Overall molecular weight (g/mol) |
|---|---|---|---|---|---|
| 1 | A  MIAK | 60.00 | 0.53 | 5.73 | 3912.72 |
| 2 | TsCl | 24.00 | 0.09 | 1.00 | |
| 3 | TPMA | 0.28 | 0.00 | 0.01 | |
| 4 | CuCl2 | 0.10 | 0.00 | 0.01 | |
| 5 | MeOH | 3.83 | 0.12 | 1.26 | |
| 6 | MIAK | 20.00 | 0.18 | 2.96 | |
| 7 | dicumylperoxide | 16.00 | 0.06 | 0.62 | |
| 8 | ACHN | 8.00 | 0.03 | 0.35 | |
| 9 | styrene | 480.00 | 3.33 | 35.14 | | where, MIAK - methyl isoamyl ketone was obtained from Eastman TsCl = p-toluene sulfonyl chloride was obtained from Sigma Aldrich TPMA = Tris(2-pyridylmethyl)amine was obtained from Sigma Aldrich $CuCl_2$ = copper chloride and MeOH = methanol were obtained from Sigma Aldrich ACHN = 1,1'-Azobis(cyanocyclohexane) was obtained from Akzo Nobel Coatings INC Dicumyl peroxide was obtained from Sigma Aldrich Styrene was obtained from Sigma Aldrich The degree of change in the temperature from a target temperature during the monomer conversion period in the process as shown in FIG. 12 is in the range of ≥−2.0° C. to ≤+17.0° C. or 2-1.8% to ≤+15.5%.

Discussion of Results

The results in the Tables 2, 4, 8, and 11; and FIGS. 1-4, 7-8 and 10-11 of the inventive Examples 1-4 shows that the process of the presently claimed invention enables controlled polymerization of polymerizable monomers. The temperature profiles for the inventive examples as shown in FIGS. 1, 3, 7 and 10 indicates an extremely well controlled acrylic polymerization. The super advanced ATRP method mimics the conventional semi-batch process of free radical polymerization which is considered one of the safest methods for industrial scale production. The monomer starved condition in the super advanced ATRP process ensures no uncontrolled exothermic explosion in the reactor. In contrast, when a traditional ATRP was conducted or attempted to conduct in experiment as shown in Comparative Examples 1, 2 and 3 an auto accelerated exothermic condition emerged. In case of Comparative Example 1, applying cooling air was able to subside the exotherm, however, in the case of Comparative Example 2, where a highly reactive monomer HEA was used, the reaction had been terminated immediately by adding an acrylic inhibitor.

Thus, the process of the presently claimed invention is also suitable for highly reactive monomers like 2-hydroxyethyl acrylate as shown in Example 3 in contrast to traditional ATRP used in Comparative Example 2. The process of the presently claimed invention provides even better control on mitigation of exotherm and eliminates the requirement of having a large volume of reactive olefinic/styrene monomers in the reactor at a given time. Contrary to the concept in traditional ATRP, the results disclosed in the presently claimed invention confirmed that in this process a negligible radical-radical termination and side reactions of the polymer chain radical and the catalyst with the incoming oxygen takes place. It is a surprising outcome that the block-copolymer with narrow polydispersity and a good control on the molecular weight can be achieved through this monomer-starved ATRP as shown in Table 2, 4, 8 and 11.

Advantages (i) the process described herein enables controlled polymerization of polymerizable monomers, (ii) the process described herein provides excellent control on the exotherm and prevents uncontrolled exothermic explosion during the polymerization reaction, (iii) the process described herein unlike traditional controlled radical polymerization process enables control on exotherm even on continuous addition of oxygen and inhibitor into the reaction mixture, (iv) the process described herein can be carried out in air sensitive conditions in existing plant set up, (v) the process described herein provides a good control on the molecular weight of the resulting polymer obtained, (vi) the polymer obtained by the process described herein has narrow polydispersity, (vii) the process described herein can be carried out as a semi-batch and a continuous process to suit industrial scale production, (viii) the process described herein is suitable also for polymerization of highly reactive monomers without the risk of uncontrolled exotherm, (ix) the process described herein can be carried out with use of lower amounts of catalyst and initiator, and (x) the process described herein is a safest way to run polymerization of highly reactive monomers in a large scale.

Test Methods

Molecular Weight Determination

To determine polymer molecular weights ($M_w$, $M_n$ and $M_p$) by gel permeation chromatography (GPC), fully dissolved molecules of a polymer sample are fractionated on a porous column stationary phase. Tetrahydrofuran (THF) is used as the eluent solvent. The stationary phase is combination of Waters Styragel HR 5, HR 4, HR 3, and HR 2 columns. Five milligrams of sample are added to 1.5 mL of eluent solvent and filtered through a 0.5 μm filter. After filtering, 100 μl of the polymer sample solution is injected into the column at a flow rate of 1.0 ml/min. Separation takes place according to the size of the polymer coils which form in the eluent solvent. Small molecules diffuse into the pores of the column material more frequently and are therefore retarded more than large molecules. Thus, large molecules are eluted earlier than small molecules.

The molecular weight distribution, the number average molecular weight $M_n$, weight average molecular weight $M_w$, and molecular weight of the highest peak $M_p$ of the polymer samples were calculated with the aid of chromatography software utilizing a calibration curve generated with the PL-Polymer Standards kit which includes a series of unbranched-polystyrene standards of varied molecular weights available from Polymer Laboratories.

Polydispersity Index (PDI) Determination

The PDI is determined according to the formula $M_w/M_n$, where $M_w$ is the weight average molecular weight and $M_n$, is the number average molecular weight. The PDI of the polymer samples were calculated with the aid of chromatography software utilizing a calibration curve generated with the PL-Polymer Standards kit which includes a series of unbranched-polystyrene standards of varied molecular weights available from Polymer Laboratories.

Acetylation of polymer IV (polyHEA) from example 3

At monomer conversion >99% in example 3, polymer IV (polyHEA) was not soluble in THF as it is. Therefore, for GPC analysis, polyHEA was acetylated by adding 10 equivalent of acetic anhydride and a catalytic amount of triethylamine into a mixture of 5 mg of polyHEA and 1.5 mL of THF. Upon stirring for 5 h at room temperature the solution was filtered through a 0.5 μm filter and analysed by GPC to determine $M_w$, $M_n$ and $M_p$.

Temperature Profile Measurement

Reaction time vs. temperature profiles for synthesis of copolymer I-III and polymer IV-V were recorded using a temperature controller from J-KEM Scientific Model 210 using KEM-NET software. A temperature probe was inserted inside the solution which was connected to the controller. The controller was further connected to a computer equipped with KEM-NET software. The set temperature (desired temperature of the reaction) and observed temperature were recorded into KEM-NET software which was further plotted using Excel software.

Monomer Conversion Determination

Monomer conversions at various time intervals was measured by taking out aliquots using a needle and syringe at the given time followed by dissolving it in chloroform ($CDCl_3$) for copolymer I-III and in DMSO-$d_6$ for polymer IV and V and analyzing it by 1H NMR spectroscopy in a Bruker Ultrashield 300 MHz NMR instrument. For copolymer VI, the monomer conversion was measured by Agilent 6890N Network Gas Chromatography equipped with Supelco Equity 5 Capillary GC Column L×I.D. 30 m×0.25 mm, d; 1.00 μm.

Residual Monomer Determination

During the synthesis of copolymer I-III, the amount of "residual monomers/Total monomers (%)" at the specified time was determined by integration of the remaining olefinic signals (protons at 5.2-6.5 ppm) of the monomers against aromatic signals of the p-toluene sulfonyl chloride (TsCl) (protons at 7.6-7.8 ppm) as internal standard followed by dividing this number with the theoretical number of protons for 100% added monomers with respect to 1 equivalent of TsCl in each step. For the synthesis of polymer IV, the amount of "residual monomers/Total monomers (%)" was calculated by integration of the remaining olefinic signals (protons at 5.2-6.5 ppm) of 2-hydroxyethyl acrylate (HEA) against one set of $CH_2$ signals of HEA (protons at 3.8-4.2 ppm) as internal standard followed by dividing this number with the theoretical number of protons for 100% added monomers with respect to 1 equivalent of ethyl 2-bromoisobutyrate (EBiB). For copolymer VI, the conversion was measured by gas chromatography using MIBK as internal standard and using a calibration table generated from three different ratios of MIBK and styrene; MIBK and butyl acrylate; and MIBK and N-vinyl carbazole.

The invention claimed is:

1. A process for preparing a polymer comprising at least the steps of
    i) preparing a polymerization mixture comprising
        a) at least one transition metal catalyst,
        b) at least one reducing agent, and
        c) at least one atom-transfer radical polymerization initiator; and
    ii) subsequently adding at least one free radically co-polymerizable monomer to the polymerization mixture to obtain the polymer;
    wherein the at least one free radically co-polymerizable monomer is added at a rate in the range of ≥0.08 wt. %/minute to ≤1.66 wt. %/minute, based on the total weight of the at least one free radically co-polymerizable monomer in step (ii);
    wherein step i) occurs without adding at least one free radically co-polymerizable monomer.

2. The process according to claim 1, wherein the a) at least one transition metal catalyst is a transition metal-halide catalyst.

3. The process according to claim 1, wherein the b) at least one reducing agent is selected from the group consisting of tin 2-ethylhexanoate, sulfites, bisulfites, thiosulfites, mercaptans, hydroxylamines, amines, hydrazines, phenylhydrazines, hydrazones, hydroquinones, food preservatives, flavonoids, beta carotene, vitamin A, C-tocopherols, vitamin E, propyl gallate, octyl gallate, propionic acids, ascorbic acid, sorbates, reducing sugars, sugars comprising an aldehyde group, glucose, lactose, fructose, dextrose, potassium tartrate, nitrites, dextrin, aldehydes, glycine and antioxidants.

4. The process according to claim 1, wherein the b) at least one reducing agent is a free radical initiator.

5. The process according to claim 1, wherein the c) at least one atom-transfer radical polymerization initiator is selected from the group consisting of sulfonyl halides, alkyl halides and substituted alkyl halides.

6. The process according to claim 1, wherein the at least one free radically co-polymerizable monomer is added intermittently or continuously.

7. The process according to claim 1, wherein the molar ratio of the at least one free radically co-polymerizable monomer to the at least one transition metal catalyst is in the range of ≥10:1.0 to ≤500,000:1.0.

8. The process according to claim 1, wherein the molar ratio of the at least one free radically co-polymerizable monomer to the at least one atom-transfer radical polymerization initiator is in the range of ≥1.0:1.0 to ≤10,000:1.0.

9. The process according to claim 1, wherein the molar ratio of the at least one transition metal catalyst to the at least one atom-transfer radical polymerization initiator is in the range of ≥0.0005:1.0 to ≤50:1.0.

10. The process according to claim 4, wherein the molar ratio of the at least one free radical initiator to the at least one atom-transfer radical polymerization initiator is in the range of ≥0.005:1.0 to ≤50.0:1.0.

11. The process according to claim 1, wherein the polymerization mixture further comprises at least one solvent.

12. The process according to claim 1, wherein the at least one free radically co-polymerizable monomer is added at a rate in the range of >0.17 wt. %/minute to ≤0.83 wt. %/minute, based on the total weight of the at least one free radically co-polymerizable monomer.

13. The process according to claim 1, wherein in step ii) the temperature is maintained in the range of ≥35° C. to ≤150° C.

14. The process according to claim 1, wherein in step ii) the degree of change in the temperature from a target temperature is in the range of ≥−10.0% to ≤+10.0%.

15. The process according to claim 1, wherein the at least one free radically co-polymerizable monomer is selected from the group consisting of styrene, alpha-methyl styrene, methyl acrylate, ethyl acrylate, butyl acrylate, isobutyl acrylate, dodecyl acrylate, n-octyl acrylate, 2-chloroethyl acrylate, carboxyethyl acrylate, phenyl acrylate, benzyl acrylate, methyl alphachloroacrylate, methyl methacrylate, ethyl methacrylate, butyl methacrylate, isobutyl methacrylate, dodecyl methacrylate, n-octyl methacrylate, 2-chloroethyl methacrylate, carboxyethyl methacrylate, phenyl methacrylate, methyl alphachloromethacrylate, benzyl methacrylate, butadiene, isoprene, methacrylonitrile, acrylonitrile, vinyl methyl ether, vinyl isobutyl ether, vinyl ethyl ether, vinyl acetate, vinyl propionate, vinyl benzoate, vinyl butyrate, vinyl methyl ketone, vinyl hexyl ketone, methyl isopropenyl ketone, vinylidene chloride, vinylidene chlorofluoride, N-vinyl pyrrolidone, N-Vinylcarbazole, acrylic acid, methacrylic acid, acrylamide, methacrylamide, vinylpyridine, vinylpyrrolidone, vinyl-N-methylpyridinium chloride, vinyl naphthalene, p-chlorostyrene, vinyl chloride, vinyl bromide, vinyl fluoride, ethylene, propylene, butylene, isobutylene, 2-ethylbutyl acrylate, 2-ethylbutyl methacrylate, 2-ethylhexyl acrylate, 2-ethylhexyl methacrylate, 2-hydroxyethyl acrylate, 2-hydroxyethyl methacrylate, 2-hydroxypropyl acrylate, 2-hydroxypropyl methacrylate, 3-hydroxypropyl acrylate, 3-hydroxypropyl methacrylate, 3-hydroxybutyl acrylate, 3-hydroxybutyl methacrylate, 4-hydroxybutyl acrylate, 4-hydroxybutyl methacrylate, 6-hydroxyhexyl acrylate, 6-hydroxyhexyl methacrylate, 3-hydroxy-2-ethylhexyl acrylate, 3-hydroxy-2-ethylhexyl methacrylate, glycidyl acrylate, glycidyl methacrylate, and mixtures thereof.

* * * * *